United States Patent
Prakash et al.

(10) Patent No.: US 8,254,364 B2
(45) Date of Patent: Aug. 28, 2012

(54) ROUTE PROTOCOL

(75) Inventors: Rajat Prakash, La Jolla, CA (US); Parag Arun Agashe, San Diego, CA (US); Fatih Ulupinar, San Diego, CA (US); David R. Mazik, Howell, NJ (US); Ragulan Sinnarajah, Markham (CA); Ravindra Patwardhan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1009 days.

(21) Appl. No.: 12/107,000

(22) Filed: Apr. 21, 2008

(65) Prior Publication Data

US 2008/0291868 A1  Nov. 27, 2008

Related U.S. Application Data

(60) Provisional application No. 60/913,988, filed on Apr. 25, 2007, provisional application No. 60/949,297, filed on Jul. 12, 2007.

(51) Int. Cl.
*H04W 40/24* (2009.01)
(52) U.S. Cl. .......................... 370/349; 709/230
(58) Field of Classification Search .................. None
See application file for complete search history.

(56) References Cited

U.S. PATENT DOCUMENTS

| 7,046,647 | B2 | 5/2006 | Oba et al. | |
| 7,339,957 | B2 * | 3/2008 | Hitt | 370/509 |

OTHER PUBLICATIONS

3GPP2 C.S0084-004-0, Application Layer for Ultra Mobile Broadband (UMB) Air Interface Specification, Apr. 2007, Version 1.0.*
3GPP2 C.S0084-008-0, Route Control Plane for Ultra Mobile Broadband (UMB) Air Interface Specification, Aug. 2007, Version 2.0.*
3GPP2 C.S0084-003-0, Radio Link Layer for Ultra Mobile Broadband (UMB) Air Interface Specification, Aug. 2007, Version 2.0.*
"Route Control Plane for Ultra Mobile Broadband (UMB) Air Interface Specification" 3GPP2 C. Pxxxx-0-08, Version 0.50, Feb. 2007.
International Search Report—PCT/US08/061588, International Search Authority—European Patent Office, Sep. 17, 2008.
Written Opinion—PCT/US08/061588, International Search Authority—European Patent Office, Sep. 17, 2008.
3GPP2 C.S0084-003-0 "Radio Link Layer for Ultra Mobile Broadband (UMB) Air Interface Specification", Version 1.0, (Apr. 5, 2007).
3GPP2 C.S0084-008-0 "Route Control Plane for Ultra Mobile Broadband (UMB) Air Interface Specification", Version 1.0, (Apr. 5, 2007).

* cited by examiner

*Primary Examiner* — Kwang B Yao
*Assistant Examiner* — Alex Skripnikov
(74) *Attorney, Agent, or Firm* — Francois A. Pelaez; Darren M. Simon

(57) ABSTRACT

A route protocol is established whereby a mobile device can communicate to a multitude of (receiving) base stations though a tunnel created through a serving base station. A message that includes a Route Creation Header can be transmitted by the mobile device to create the tunnel. The Route Creation Header is reviewed by the receiving base station while the mobile device is in a Waiting-To-Open State. Various errors might occur with respect to the Route Creation Header. These errors can be conveyed to the mobile device by base station by setting one or more error code fields. Once the errors are resolved, another attempt to create a tunnel with base station can be made, if desired.

14 Claims, 9 Drawing Sheets

ROUTE PROTOCOL

CROSS-REFERENCE

This application claims the benefit of U.S. Provisional Application Ser. No. 60/913,988, filed Apr. 25, 2007, entitled "Methods and Apparatus for Providing Route Protocol," and U.S. Provisional Application Ser. No. 60/949,297, filed Jul. 12, 2007, entitled "Route Protocol Design for UMB", both of which are assigned to the assignee hereof and the entirety of these applications are incorporated herein by reference.

BACKGROUND

I. Field

The following description relates generally to wireless communication systems and more particularly to establishing communication routes or tunnels in wireless communication systems.

II. Background

Wireless communication systems have become a prevalent means by which a majority of people worldwide have come to communicate. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, orthogonal frequency division multiple access (OFDMA) systems, and other systems.

A typical wireless communication system or network (e.g., employing frequency, time, and/or code division techniques) includes one or more base stations that provide a coverage area and one or more mobile (e.g., wireless) terminals that can transmit and receive data within the coverage area. A typical base station can concurrently transmit multiple data streams for broadcast, multicast, and/or unicast services, wherein a data stream is a stream of data that can be of independent reception interest to a mobile terminal. A mobile terminal within the coverage area of a base station can be interested in receiving one, more than one, or all the data streams carried by the composite stream. Likewise, a mobile terminal can transmit data to the base station or another mobile terminal.

In such communication systems, it is desirable to provide uninterrupted service when the mobile device moves between neighboring geographic cells, referred to as handoff. Such transfer is important since an interruption can result in quality degradation, dropped communications, or other undesirable situations. Thus, there is a need to support handovers from a current base station to a target base station.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with creating tunnels between two or more base stations.

An aspect relates to a method for creating a tunnel relationship between a mobile device and a base station. The method includes selecting at least one base station for establishment of communication through a tunnel and transmitting a message that includes a Route Creation Header to the at least one base station. The Route Creation Header comprises one or more parameters associated with defining a tunnel. The method also includes waiting for a confirmation of the Route Creation Header and transitioning out of a Waiting-To-Open state if the confirmation is received. The confirmation indicates creation of the tunnel relationship.

Another aspect relates to a wireless communications apparatus that includes a memory and a processor. The memory retains instructions related to selecting at least one base station for establishment of communication through a tunnel and transmitting a message that includes a Route Creation Header to the at least one base station. The memory further retains instructions related to waiting for a confirmation of the Route Creation Header and transitioning out of a Waiting-To-Open state if the confirmation is received. The Route Creation Header comprises one or more parameters associated with defining the tunnel. The processor is coupled to the memory and is configured to execute the instructions retained in the memory.

A further aspect relates to a computer program product comprising a computer-readable medium. The computer-readable medium includes a first set of codes for causing a computer to select at least one base station for establishment of communication through a tunnel and a second set of codes for causing the computer to transmit a message that includes a Route Creation Header to the at least one base station. The Route Creation Header comprises one or more parameters associated with defining the tunnel. The computer-readable medium includes a third set of codes for causing the computer to wait for a confirmation of the Route Creation Header and a fourth set of codes for causing the computer to transition out of a Waiting-To-Open state if the confirmation is received. The confirmation includes receiving a packet from the at least one base station.

A further aspect relates to an apparatus that includes a means for selecting at least one base station for establishment of communication through a tunnel and a means for transmitting a message that includes a Route Creation Header to the at least one base station. The Route Creation Header comprises one or more parameters associated with defining the tunnel. The apparatus also includes a means for waiting for a confirmation of the Route Creation Header. The confirmation includes receiving a packet from the at least one base station. The means for transmitting the message can re-transmit the message that includes the Route Creation Header to the at least one base station until the confirmation is received. Also included is a means for transitioning out of a Waiting-To-Open state when the confirmation is received.

Still another aspect relates to at least one processor for route protocol. The processor comprises a first module operable to choose at least one base station for establishment of communication through a tunnel and a second module operable to transmit a message that includes a Route Creation Header to the at least one base station. The Route Creation Header comprises one or more parameters associated with defining the tunnel. The processor also includes a third module operable to wait for a confirmation of the Route Creation Header. The confirmation includes receiving a packet from the at least one base station. Also included in processor is a fourth module operable to re-transmit the message that includes the Route Creation Header to the at least one base station until the confirmation is received and a fifth module operable to transition out of a Waiting-To-Open state when the confirmation is received.

Another aspect relates to a method for creating a tunnel relationship between a mobile device and a base station. The method includes receiving a message that includes a Route Creation Header from a mobile device. The Route Creation Header comprises one or more parameters associated with defining a tunnel. The method also includes determining if the mobile device is in a Waiting-To-Open state and reviewing the Route Creation Header for at least one error if the device is in the Waiting-To-Open state. Further, the method includes creating a Route Protocol Message in response to the received message and transmitting the created Route Protocol Message to the mobile device.

Still another aspect relates to a wireless communications apparatus that includes a memory and a processor. The memory retains instructions related to receiving a message that includes a Route Creation Header from a mobile device. The Route Creation Header comprises one or more parameters associated with defining a tunnel. The memory also retains instructions related to determining if the mobile device is in a Waiting-To-Open state and reviewing the Route Creation Header for at least one error if the device is in the Waiting-To-Open state. The memory further retains instructions related to creating a Route Protocol Message in response to the received message and transmitting the created Route Protocol Message to the mobile device. The processor is coupled to the memory and is configured to execute the instructions retained in the memory.

A further aspect relates to a computer program product that includes a computer-readable medium. The computer-readable medium includes a first set of codes for causing a computer to receive a message that includes a Route Creation Header from a mobile device. The Route Creation Header comprises one or more parameters associated with defining a tunnel. The computer-readable medium also includes a second set of codes for causing the computer to determine if the mobile device is in a Waiting-To-Open state and a third set of codes for causing the computer to review the Route Creation Header for at least one error if the device is in the Waiting-To-Open state. Further included in the computer-readable medium is a fourth set of codes for causing the computer to create a Route Protocol Message in response to the received message and a fifth set of codes for causing the computer to transmit the created Route Protocol Message to the mobile device.

Yet another aspect relates to an apparatus that includes a means for receiving a message that includes a Route Creation Header from a mobile device. The Route Creation Header comprises one or more parameters associated with defining a tunnel. The apparatus also includes a means for determining if the mobile device is in a Waiting-To-Open state and a means for reviewing the Route Creation Header for at least one error if the device is in the Waiting-To-Open state. Further, the apparatus includes a means for creating a Route Protocol Message in response to the received message and a means for transmitting the created Route Protocol Message to the mobile device.

Another aspect relates to at least one processor for route protocol. The processor includes a first module operable to receive a message that includes a Route Creation Header from a mobile device. The Route Creation Header comprises one or more parameters associated with defining a tunnel. The processor also includes a second module operable to determine if the mobile device is in a Waiting-To-Open state and a third module operable to review the Route Creation Header for at least one error if the device is in the Waiting-To-Open state. The Route Creation Header is ignored if the device is not in the Waiting-To-Open state. Further included in the processor is a fourth module operable to create a Route Protocol Message in response to the received message and a fifth module operable to transmit the created Route Protocol Message to the mobile device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of the various aspects may be employed. Other advantages and novel features will become apparent from the following detailed description when considered in conjunction with the drawings and the disclosed aspects are intended to include all such aspects and their equivalents.

DETAILED DESCRIPTION

Figure 1:
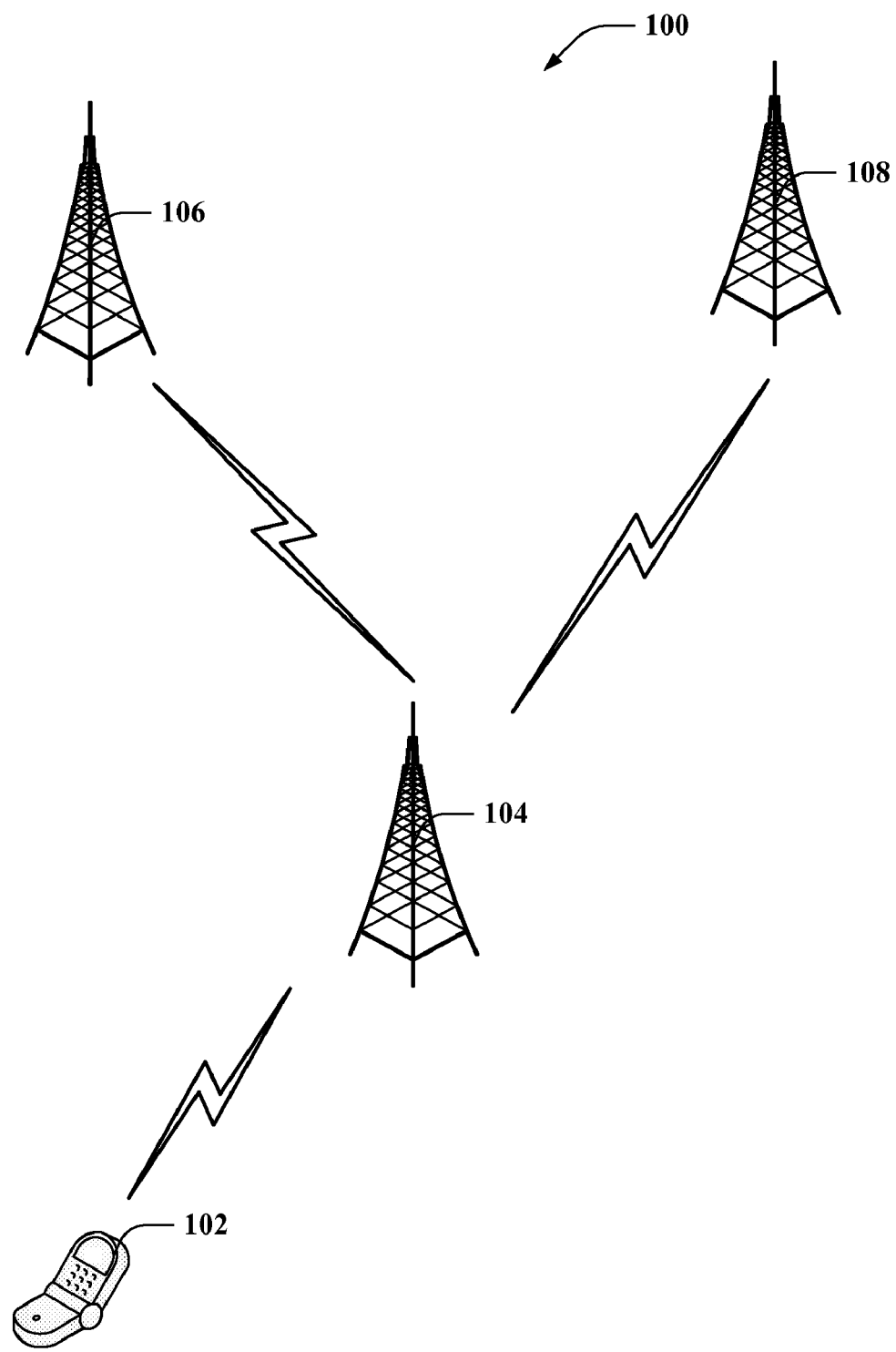
FIG. 1 illustrates a wireless communication system in accordance with various aspects presented herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal. A wireless terminal can also be called a system, subscriber unit, subscriber station, mobile station, mobile, mobile device, device remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a smart phone, a wireless local loop (WLL) station, a personal digital assistant (PDA), a laptop, a handheld communication device, a handheld computing device, a satellite radio, and/or another processing device for communicating over a wireless system. Moreover, various aspects are described herein in connection with a base station. A base station may be utilized for communicating with wireless terminal(s) and may also be referred to as an access point, Node B, or some other terminology.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication system 100 in accordance with various aspects presented herein is illustrated. System 100 can comprise one or more base stations in one or more sectors that receive, transmit, repeat, and so forth, wireless communication signals to each other and/or to one or more mobile devices. Each base station can comprise multiple transmitter chains and receiver chains (e.g., one for each transmit and receive antenna), each of which can in turn comprise a plurality of components associated with signal transmission and reception (e.g., processors, modulators, multiplexers, demodulators, demultiplexers, antennas, and so forth). Each mobile device can comprise one or more transmitter chains and receiver chains, which can be utilized for a multiple input multiple output (MIMO) system. Each transmitter and receiver chain can comprise a plurality of components associated with signal transmission and reception (e.g., processors, modulators, multiplexers, demodulators, demultiplexers, antennas, and so on), as will be appreciated by one skilled in the art.

As illustrated, a mobile device 102 can send and/or receive packets with a base station 104 over a wireless link, referred to herein as primary base station 104. Within wireless communication system 100, there can be other base stations, such as base stations 106 and 108, which are out of range of mobile device 102. Thus, connectivity cannot be established directly with these base stations 106, 108. However, a technique, referred to as tunneling, can be utilized in order for mobile device 102 to communicate with base stations 106 and 108 through primary base station 104. Base stations 106 and 108 are referred to herein as secondary base stations. Although a number of mobile device(s) 102 and base stations(s) 104, 106, and 108 can be included in wireless communication system 100, as will be appreciated, a single mobile device 102 that transmits communication data signals to a single primary base station 104, which tunnels those signals to two secondary base stations 106 and 108 is illustrated for purposes of simplicity.

For example, a mobile device 102 can observe a radio signal (e.g., a pilot waveform) from secondary base station 106 and/or 108, however, the observed signal might not be strong enough (e.g., weak signal) to enable direct communication with secondary base stations 106 or 108. However, mobile device 102 would like to establish a relationship with one or more of the secondary base stations 106, 108 by establishing a tunnel through primary base station 104 and acquiring reserved resources on the secondary base station 106, 108. If the signal with one or more of the secondary base stations 106, 108 becomes stronger, mobile device 102 might want to have direct communication with the secondary base stations 106, 108 over the physical layer. Thus, the tunnel can be established in anticipation of eventually having direct communication with the one or more of the secondary base stations 106, 108. The tunnel can reserve resources on the secondary base stations 106, 108, which allows mobile device 102 to establish a secure relationship with secondary base stations 106, 108. In such a manner, a smooth and/or efficient handover can be achieved as mobile device 102 is handed off from primary base station 104 to a secondary base station 106, 108.

Various aspects disclosed herein relate to the establishment and/or destruction of the relationship (e.g., route or tunnel) between access terminal 102 and base stations 106 and 108. One or more of the aspects disclosed herein relates to the addressing or signaling that is utilized for establishing and/or removing the tunnels. Additionally or alternatively, some of the aspects relate to the type of messages and type of functionalities that can be achieved through the tunnels. Details relating to these aspects will be described in further detail with reference to the following figures and detailed description.

Figure 2:
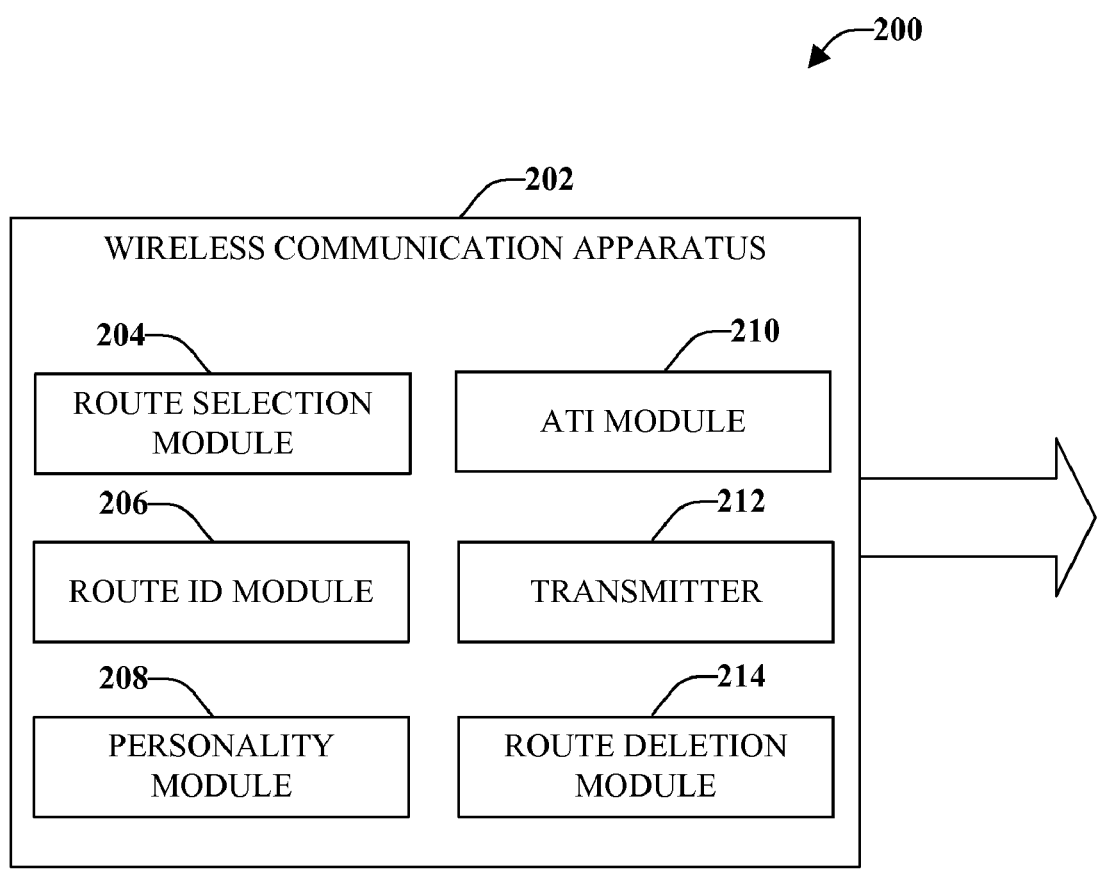
FIG. 2 illustrates a system that facilitates route protocol in a wireless communication environment.

FIG. 2 illustrates a system 200 that facilitates route protocol in a wireless communication environment. System 200 includes a wireless communication apparatus 202 that is shown to be transmitting data through a channel. Although depicted as transmitting data, wireless communication apparatus 202 can also receive data through the channel (e.g., wireless communication apparatus 202 can concurrently transmit and receive data, wireless communication apparatus 202 can transmit and receive data at differing times, a combination thereof, and so forth). Wireless communication apparatus 202, for example, can be a mobile device (e.g., mobile device 102 of FIG. 1). For purposes of understanding, wireless communication apparatus 202 will be referred to herein as mobile device 202.

Included in mobile device 202 is a route selection module 204 that can decide whether a tunnel should be created through a primary base station to one or more secondary base stations. This tunnel can allow mobile device 202 to communicate with the one or more secondary base stations through the primary base station. The tunnel can be implemented by a route protocol and an inter-route tunneling protocol. Headers in these protocols provide specific functionality for the various tunnels. A Route Creation Header includes one or more parameters associated with defining the tunnel. For example, the Route Creation Header can convey information related to the personality selected for the route, the route identification of the route, whether existing routes should be deleted, as well as other parameters associated with creating and/or deleting routes (or tunnels).

A route identifier (ID) module 206 can determine a route identifier (RouteID), which is different for each tunnel created by mobile device 202. The RouteID is included in the Route Creation Header by route ID module 206. Both the base station and the mobile device can detect stale messages (messages not directed to a currently In-Use Route instance) by utilizing the RouteID. Since the base stations create and delete routes to the mobile devices there can be the possibility of a mismatch between a route instance at a base station and a mobile device. For example, a base station may have an old route instance for a mobile device, even though the mobile device created a new route. The RouteID allows the base station and mobile device to determine if the same route instance is being utilized to communicate, which can be determined when a route instance is created. The determination is made for over-the-air communications and/or one to one mapping between a MACID and the RouteID. For tunneled communication, the RouteID is included in Inter-Route Tunneling Protocol (IRTP) headers. The RouteID in an IRTP header is included in base station to base station communication (in Link Layer Tunnel header) and vise versa.

In accordance with some aspects, the route or tunnel can already be established with the secondary base station. In this situation, a packet can be received from the base station, in response to a request to create a route. The packet can include a route already established error code and a route identification of the established route. Based on this information, mobile device 202 can determine that a tunnel relationship has already been established and, therefore, does not need to be reestablished. There can be more than one tunnel associated with mobile device 202. For example, mobile device 202 can have multiple tunnels for multiple (secondary) base stations (e.g., one tunnel for base station 106 of FIG. 1 and a second tunnel for base station 108). Each tunnel has a different RouteID. In accordance with some aspects, the RouteID is a seven-bit identifier, such as seven of the next unused Least Significant Bits (LSBs) of a RouteCounter.

For example purposes and not limitation, whenever messages are sent over a tunnel that has already been established, mobile device 202 sends the messages to the primary base station to which it is directly connected. The primary base station forwards the messages to the tunneling point base station (e.g., secondary base station). When the primary base station sends the message to the secondary base station, the message includes the RouteID with each message. In some situations there might have been multiple tunnels attempted to be established with the same secondary base station. For example, a first tunnel was established and then an error was received so a second tunnel was established. These two tunnels have different route IDs. Due to jitter or bad propagation over the network, messages might start arriving at the secondary base station in an incorrect order. Since the RouteID is included in each message, the secondary base station is able to reject the messages that corresponding to the no longer existing tunnel that is superseded by the existence of another tunnel (identified by the RouteID). Thus, the RouteID in each message can mitigate the stale messages that are sent to a tunnel no longer in existence.

Another field included in the route protocol is a personality that defines a personality for the route, which is determined by a personality module 208. This determination can be made based on pre-negotiated types of tunnels that are supported by mobile device 202. A personality is a collection of protocol types and a collection of certain attribute or parameter values. Each protocol includes attributes that indicate the features that are activated at any point in time. The personality can also include a revision number for the protocol. In order for connectivity to operate between mobile device 202 and the destination (e.g., base station at the other end of the tunnel, the secondary base station), both entities (e.g., mobile device and secondary base station) should agree on the communication language. Once the two entities (e.g., mobile device and secondary base station) agree on what personality will be utilized, there can be communication. A list of predetermined personalities and a route creation header can identify which language will be used in a particular route. The personality is the Initial Protocol Set Identification (IPSI) and Personality Index (or Protocol Set Identifier (PSI)). If there is a pending personality switch, the mobile device sets the personality to the pending personality value.

In accordance with some aspects, the personality selected by personality module 208 may not be supported by the secondary base station. In this situation, mobile device 202 receives an error code from secondary base station indicating that the personality is not supported. The mobile device 202 might also receive a list of personalities that are supported and from which personality module 208 can review the list and choose a personality supported by mobile device 202. The Route Creation Header Packet can be modified to include the selected personality information and transmit the information to the selected base station. In accordance with some aspects, the list of personalities received from base station are ranked in the order of preference, as determined by base station. If the mobile device supports the first ranked personality, that personality is used. If the first ranked personality is not supported, the second ranked personality can be utilized, and so forth.

In accordance with some aspects, mobile device 202 can have more than one personality active at substantially the same time. For example, the mobile device 202 has more than one route open (e.g., is in communication with more than one secondary base station). Each route can have a different personality, which is a function of the capabilities of the base station and the capabilities of the mobile device.

Also included in mobile device 202 is an Access Terminal Identifier (ATI) Module 210 that is utilized by mobile device 202 to indicate its identification to the secondary base station so that communication can be established between the two entities. The identification of the mobile device is included in an Access Terminal Identifier (ATI) header that conveys the access terminal identifier (ATI). The ATI header is set to UATI (Unicast ATI) if the UATI is assigned to the mobile device. If the UATI is not assigned to the mobile device, the ATI header is set to RATI (Random ATI).

The secondary base station can receive the ATI header and can communicate the ATI header back to the mobile device to confirm whether the base station has matched the correct ATI to the correct mobile device. For example, the base station can set the ATI header to the ATI value received from mobile device 202. If the ATI header received from base station is the correct ATI header (e.g., the ATI header that corresponds to mobile device 202), the mobile device 202 can achieve an ATI binding state, which indicates that the base station and mobile device 202 are aware of each other. In accordance with some aspects, the ATI header can be a 128-bit identifier of mobile device 202.

The ATI header is included by mobile device 202 if Connected State protocol is in BindATI state. For example, mobile device 202 remains in the BindATI if a Route Protocol header that contains an ATI header identical to the ATI header sent by the mobile device 202 has not been received from the secondary base station. The mobile device 202 exits the BindATI state if a Route Protocol header received from the secondary base station contains the identical ATI header sent by mobile device 202.

The Route Creation Header is sent by a transmitter 212, associated with mobile device 202, until a confirmation is received that the secondary base station has created the tunnel and/or until a packet is received from the base station. The confirmation indicates creation of the tunnel relationship. Until this confirmation is received, mobile device 202 is in a Waiting-To-Open state and the mobile device continues to transmit the Route Creation Header. The Waiting-To-Open State indicates that the mobile device 202 has not received packets from the secondary base station on this route. Transmitter 212 can continue to send the Route Creation Header until the confirmation is received. At substantially the same time as the confirmation is received, mobile device 202 exits (or transitions out of) the Waiting-To-Open state and the route creation header is no longer sent by transmitter 212.

In accordance with some aspects, at substantially the same time as receiving the ATI header from secondary base station, mobile device 202 sends an ATIReceived(ATIType, ATI, RouteStatus) indication (used by the connected state protocol (CSP)). In accordance with these aspects, if an ATI header is not present or an ErrorCode header is present, the RouteStatus is set to Failure (0x1). Otherwise, the RouteStatus is set to 0x0.

It should be noted that the ATI header information is utilized when communicating with a secondary base station, not the primary base station with which mobile device 202 has direct connectivity over the physical layer. Additionally, the ATI header is not sent during handover. However, the ATI header is sent once, when the first connection is established with a first secondary base station. After the establishment with the first secondary base station (that now knows the identity of mobile device), subsequent tunnels that are established with other secondary base stations coordinate with each other to share the identity of the mobile device 202. Thus, for subsequent ATI tunnel creation the ATI header (and ATI Module 210) might not need to perform subsequent functions, provided the base stations can communicate the ATI header information.

Thus, in some situations, the base station to which the tunnel is being created (e.g., secondary base station) may not know the most recent identifier of the mobile device, because the mobile device's address has changed. In cases where the address has not changed, the serving base station (e.g., primary base station) can communicate the address to the secondary base station. However, if the address has changed recently, the serving base station may not be aware of the change in the address, because the address change is a process between the SRNC (central controller) and the mobile device, of which serving base station is not aware. For example, if the address has changed in the last X seconds (where X is an integer, such as 5 in one example), then the mobile device includes the new address during route creation, and otherwise omits the address. This allow the secondary base station to have the most recent information about the mobile device's address in case the address recently changed and can mitigate the overhead of including the address in cases where the address did not change recently.

For example, if mobile device 202 has established tunnels with various base stations in one geographic location (e.g., New York City), those base stations should be able to communicate the ATI header amongst themselves. However, if the mobile device is turned off, such as if the user of mobile device is flying to Phoenix, the mobile device should create and transmit a Route Creation Header that includes the ATI header information to base stations located in the Phoenix area.

According to some aspects, in order to transmit a message that includes the Route Creation Header, a determination is made whether two or more Packet Consolidation Protocol Packets will be carried in a single MAC packet. Each Packet Consolidation Protocol Packet includes a Header Element record. If more than one Packet Consolidation Protocol Packets is to be sent, the Header Element record from all but one of the Packet Consolidation Protocol Packets can be omitted, which can save resources and improve system 200 efficiency.

In accordance with some aspects, a session with network might need to be closed due to various situations (e.g., credentials of the mobile device has expired). If the session is to be closed, mobile device can receive a packet that includes a session close error code and a CRCErrorDetectPattern from the secondary base station. The mobile device 202 can re-authenticate with the network (that include secondary base station) if the CRCErrorDetectPattern indicates that the session code error code is not due to a link error.

A route deletion module 214 can determine that a particular route or tunnel should be deleted and, in accordance with some aspects, a new tunnel started. Route deletion module 214 can configure a bit, within the route creation header, to indicate that the route should be deleted. This bit can be referred to as "Delete Old Route" bit. In accordance with some aspects, the Delete Old Route bit is one bit in length. If route deletion module 214 sets this bit to "1" it allows the tunnel to be deleted and restarted, if desired. If the Delete Old Route bit is set to "0", it indicates that the routes should not be deleted. In accordance with some aspects, mobile device might desire to reset the tunnel due to a malfunction, to change personality, or for other reasons. Triggers that can specify whether the delete old routes flag should be set can include the situation where the mobile device has lost a Radio Link Protocol (RLP) state.

For example, a power source is removed from mobile device 202 or there is a malfunction causing mobile device 202 to lose track of previous settings, including any tunnels that might have been established. Mobile device 202 might need to perform a reset of a tunnel and the state of various actions, such as if mobile device 202 was negotiating certain packet filters and/or attributes and due to the malfunction mobile device 202 forgot what was being negotiated. Thus, mobile device should delete the tunnel and start the tunnel establishment process again.

In accordance with some aspects, with respect to IRTP headers, the mobile device 202 utilizes an Access Node (or Network) Identifier (ANID) header if the RCP (Route Control Protocol) is in the Waiting-To-Open State. The ANID header is in response to a RouteCreate message. In accordance with some aspects, the mobile device 202 does not use a RouteID header for a destination route if a RouteMap message containing the ANID to RouteID mapping for this destination route was not sent to this base station. Thus, when the mobile device is tunneling through a first base station (e.g., primary base station) to another (e.g., secondary) base station various addressing techniques apply. For example, certain techniques use a longer address, which is referred to ANID, and there is a shorter address referred to as route ID. The shorter address (e.g., route ID) can be utilized after the mobile device had established that the mapping between the longer address and the shorter address is made available to the (secondary) base station. The mobile device can supply a table (e.g., Route Map Message) indicating which short address maps to which longer address. The mapping can be maintained at the base station. If a route ID is received that the base station does not recognize, the base station can send a query message asking the mobile device to report what ANID is corresponding to the route ID. The mobile device can respond with the ANID.

According to some aspects, the mobile device can receive a RouteMapRequest message requesting the current Route map if the serving (e.g., primary) base station receives a RouteID header (short address) and does not recognize the RouteID. The mobile device can transmit the Route map based on the request. In accordance with some aspects, the mobile device does not use a RouteID header for a destination route if a RouteMap message containing the ANID to RouteID mapping for this destination route was not sent to this base station (e.g., access network).

Figure 3:
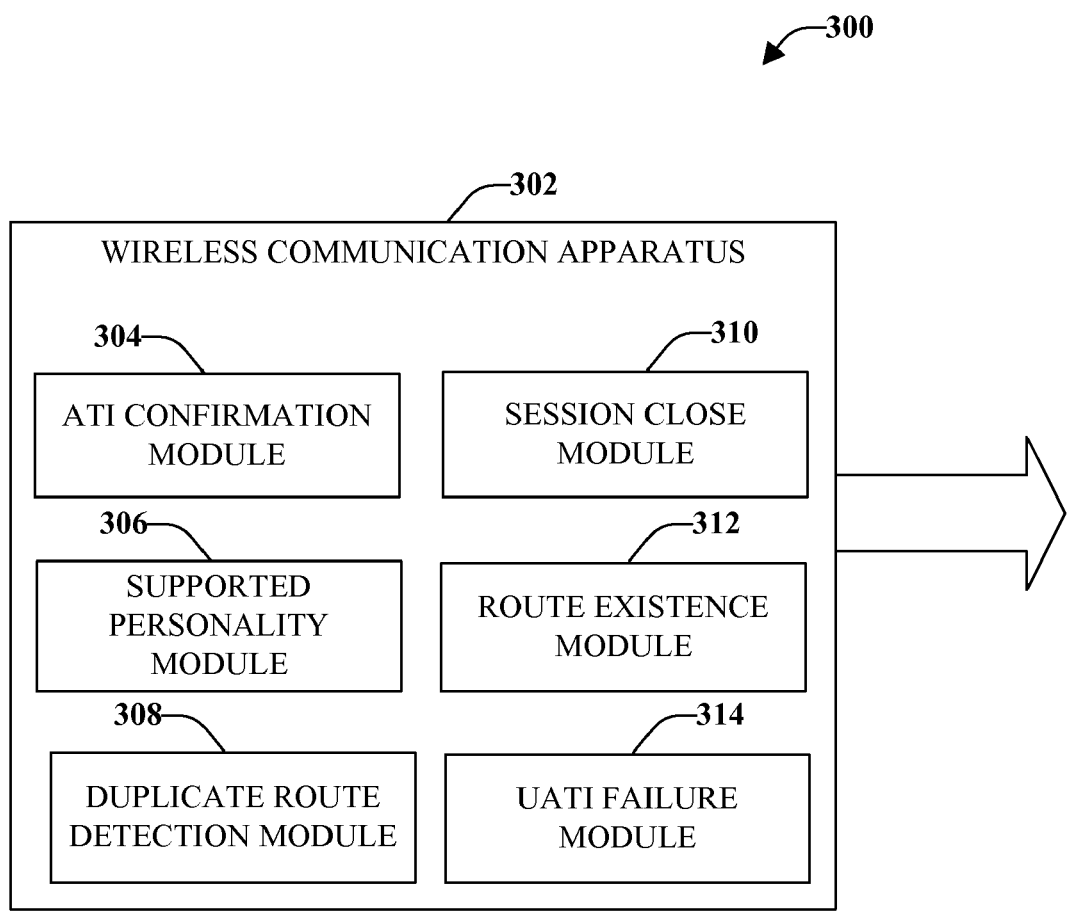
FIG. 3 illustrates a system that facilitates route protocol in a wireless communication environment.

FIG. 3 illustrates a system 300 that facilitates route protocol in a wireless communication environment. System 300 includes a wireless communication apparatus 302 that is shown to be transmitting data through a channel. Although depicted as transmitting data, wireless communication apparatus 302 can also receive data through the channel (e.g., wireless communication apparatus 302 can concurrently transmit and receive data, wireless communication apparatus 302 can transmit and receive data at differing times, a combination thereof, and so forth). Wireless communication apparatus 202, for example, can be a base station (e.g., base station 104, 106, or 108 of FIG. 1). Apparatus 302 can define various error codes in response to a route creation header received by a mobile device. For purposes of understanding, apparatus 302 will be referred to as base station 302 for the following discussion.

Base station 302 can receive a Route Creation Header from mobile device (such as mobile device 102 of FIG. 1, mobile device 202 of FIG. 2). At substantially the same time as receiving this header, base station 302 ignores the header if the Route Creation Protocol (RCP) is not in Waiting-To-Open or Waiting-To-Close State. If DeleteOldRoutes is set (e.g., equal to "1"), the base station 302 issues a DeleteOldRoutes command, which is utilized by the RCP to delete existing routes with this mobile device. If the RCP is in Waiting-To-Close state, a RouteReopen indication is sent by base station 302. This RouteReopen is utilized by the RCP to enter an Open State.

An access terminal identifier (ATI) confirmation module 304 is configured to confirm that the ATI received from a mobile device is the correct ATI for that mobile device. In order to confirm this information, the ATI confirmation module 304 can set an ATI value in an ATI Header to the ATI value received from the mobile device and send a response. The mobile device, upon receiving the ATI Header that includes the ATI can confirm that the base station 302 has (or has not) correctly identified the mobile device.

A supported personality module 306 can determine whether a personality selected by mobile device for the tunnel is supported by base station 302. If the personality is not supported, a personality error code can be sent. In accordance with some aspects, this error code is defined by "0000". The personality is a combination of protocol types and attributes. If base station 302 does not support one or more of the combination of protocol types and attributes, the personality error code is sent to the mobile device so that mobile device can select a new personality. At substantially the same time as personality error code (e.g., error code 0000) is transmitted to mobile device, a list of suggested personalities that the mobile device should utilize can also be sent by base station 302. A list of personalities supported by base station 302 can be maintained by supported personality module 306. If the personality selected by mobile device is not included in this list, supported personality module 306 indicates that it does not support the selected personality and offers suggestions as to other personalities that mobile device might select from that are supported by base station 302.

The personalities supported by base station 302 that are sent to mobile device can be a function of the identity of the mobile device (e.g., as identified by ATI Confirmation Module 304). Based on the identity of the mobile device, base station 302 can determine what personalities would be suitable for the mobile device, which is a function of the capabilities of base station 302 and the requirements of that particular mobile device. For example, base station 302 is aware of the personalities or protocols it is able to support (e.g., base station software and hardware capabilities). Thus, if the identity of mobile device indicates that it is a low power device, base station 302 might perform functions differently with that mobile device than base station 302 would if it were a high power mobile device. For example, some personalities can have power saving modes while other personalities do not support power saving modes, and so forth.

In accordance with some aspects, base station 302 accesses a Session Reference Network Controller (SRNC) and queries detailed information relating to the mobile device based on the ATI. The detailed information can include the applications supported by the mobile device. For example, the SRNC can include information whether the mobile device is a videotelephone device, a voice device, a data only device, and so forth. The SRNC is a central entity in network and can function similar to a database. Based on the information obtained from the SRNC, which includes the interpretation of personality identifiers received in the route creation header, base station 302 can suggest one or more personalities that the mobile device can utilize to establish a tunnel with base station 302. The personalities can be ranked in an order of preference.

In accordance with some aspects, mobile device might attempt to create a new tunnel when there is already a tunnel existing with base station 302. A duplicate route detection module 308 can verify that a route already exists and can send an error code to advise mobile device that there is already a tunnel established with mobile device and, therefore, the new tunnel request is rejected. In this situation, the delete all routes flag is set to zero, thus the mobile device is not requesting the tunnel to be reset or recreated but is requesting a route (which is a duplicate) to be opened with base station 302. In accordance with some aspects, the route already exists error code is defined by "0001".

An example of when a request to create a tunnel is rejected is the situation where a mobile device initiates a tunnel creation based on pilot signals it receives from base station 302. Base station 302 might be emitting multiple pilot signals, such as if it is a multiple sector base station 302 that is emitting multiple pilot signals. Mobile device might detect the first pilot signal and create a tunnel. When mobile device detects the second, or other pilot signals, it might attempt to create a second or more tunnels since it is not aware, when a tunnel request is made, that it is the same base station 302 with which a relationship already exits. Thus, the second (or more) tunnels are not necessary and base station 302 can send the route already exists error code indicating that these tunnels are not necessary.

In accordance with some aspects, a session close module 310 is included in base station 302. The session close module 310 can detect a serious error with respect to mobile device and can automatically close the session with mobile device. In accordance with some aspects, session close module 310 receives instructions from a Session Reference Network Controller that indicates the session should be closed. An error code can be sent to the mobile device indicating this error. In accordance with some aspects, this error code is defined by "0010". For example, mobile device might attempt to initiate establishment of a tunnel or might attempt to communicate through the tunnel. Access network could detect that a subscription (e.g., access to network) is not up to date (e.g., there is substantial outstanding balance due to maintain the subscription). This information can be obtained when base station 302 accesses the SRNC to determine the configuration of the mobile device. The SRNC might indicate that the mobile device's credentials have expired and mobile device should not have access to the network. Thus, this error is sent to close the session. After the session is closed, mobile device should re-authenticate with network to obtain access to network. Re-authentication can include presenting security keys to allow network to verify whether mobile device is allowed to enter the network. In accordance with some aspects, mobile device can attempt to gain access to network through a different set of security keys, or though other manners of regaining network access.

The close of session error is a serious operation because the mobile device is not allowed to have access to the network until it can reestablish its security credentials. Thus, when sending the close of session error, session close module 310 can include a CRC error detection pattern. The CRC can be an x-bit string of "1"s and "0"s that alternate a number of times, where x in an integer, and in accordance with some aspects x is sixteen. Thus, if there is an error in the physical layer packet, this predefined pattern might not match what the mobile device is expecting and can mitigate erroneous closures of the session (e.g., so that session is not closed due to a link error). At substantially the same time as the mobile device receives this error, if the CRC pattern matches, mobile device returns a CloseSession, which is utilize by the Session Control Protocol (SCP) to close the session A route existence module 312 can determine whether the mobile device does not have an existing route with base station 302. This determination can be made based on receiving a packet that does not include a Route Creation Header and determining that a route has not been established with the mobile device. The mobile device is outside the Waiting-To-Open state when this error occurs. This scenario can occur when the mobile device receives a pilot waveform and believes the pilot waveform belongs to one of the existing bases stations with which a relationship has already been established However, the pilot waveforms belongs to a base station with which a relationship has not been established. If the route does not exist, route existence module 312 sets an error code bit to indicate that the route does not belong to base station 302. In accordance with some aspects, this error code is indicated by "0011".

The route does not exist error code can occur due to a persistent route concept. In some cases when the mobile device is in idle state (e.g., no data is being exchanged), the mobile device has one persistent route (referred to as the SRNC route). When mobile device exits the idle state and attempts to establish a connection, mobile device is attempting to connect to a particular base station (e.g., a base station from which it is receiving a strong signal). Mobile device makes a determination whether this base station is the same base station with which it has a previously existing route or if it is a new base station. If it is believed to be an existing route, mobile device will not send a route creation header and will assume the tunnel or route is already established. Mobile device will start sending packets as if the route has already been established. However, in some instances, the mobile device makes a mistake and it is not the same base station with which the mobile device had a route established; it is a new base station. The new base station can indicate to the mobile device that the new base station does not have a route with mobile device nor does new base station have any knowledge about that mobile device and can request a route creation header.

These situations can occur when the mobile device is in a border area. The mobile device might have initially created a route with a source base station and then mobile device has lost contact with that base station. However, the mobile device comes into the coverage of a new base station with a similar frequency and/or pilot pn and starts sending information to the new base station, as if it were the existing base station. However, there is no connection with the new base station. At substantially the same time as receiving this error code, the mobile device can create a new route to communicate with the new base station.

Also included is a UATI failure module 314 that can determine if a terminal identifier of the mobile device changed and, it there was a change a UATI failure error code can be transmitted. In accordance with some aspects, this error code is defined by "0100". In accordance with some aspects, the identification of the mobile device can fail based on information received from a Session Reference Network Controller. This situation can occur when the UATI (terminal identifier) of the mobile device is being change at substantially the same time as a new route is created. For example, when the mobile device attempts to set up a new route or tunnel with a distant base station (e.g., secondary base station), the mobile device does not include its own UATI in the route creation process. The UATI is shared between base stations over the back haul. The base station with which the mobile device is connected directly (e.g., primary base station) communicates the information to the new base station identified by the mobile device. If the UATI has changed, the newly added base station can send an error code to indicate that the UADI is no longer valid. At substantially the same time as receiving the error code, the mobile device returns a UATIFailed indication (used by the RCP to destroy the Route). The mobile device may create a new Route to this base station after the UATI is updated.

In accordance with some aspects, with respect to IRTP headers, the base station 302 does not utilize an Access Node Identifier (ANID) header until a RouteMap is received. If the base station 302 receives a RouteID header and the base station does not recognize the RouteID the following occurs. If the RCP is in a Waiting-To-Open state, the base station delivers the Payload to the Route Protocol of the SessionAnchor Route. Otherwise, the base station sends a RouteMapRequest message to the mobile device to query the current Route map.

According to some aspects, a RouteID header (short address) can be received from a mobile device, however, the serving base station does not recognize the RouteID header. In this situation, the serving base station can send a RouteMapRequest message to the mobile device requesting a current Route Map. In accordance with some aspects, the mobile device does not use a RouteID header for a destination route if a RouteMap message containing the ANID to RouteID mapping for this destination Route was not sent to this access network (e.g., base station).

Figure 4:
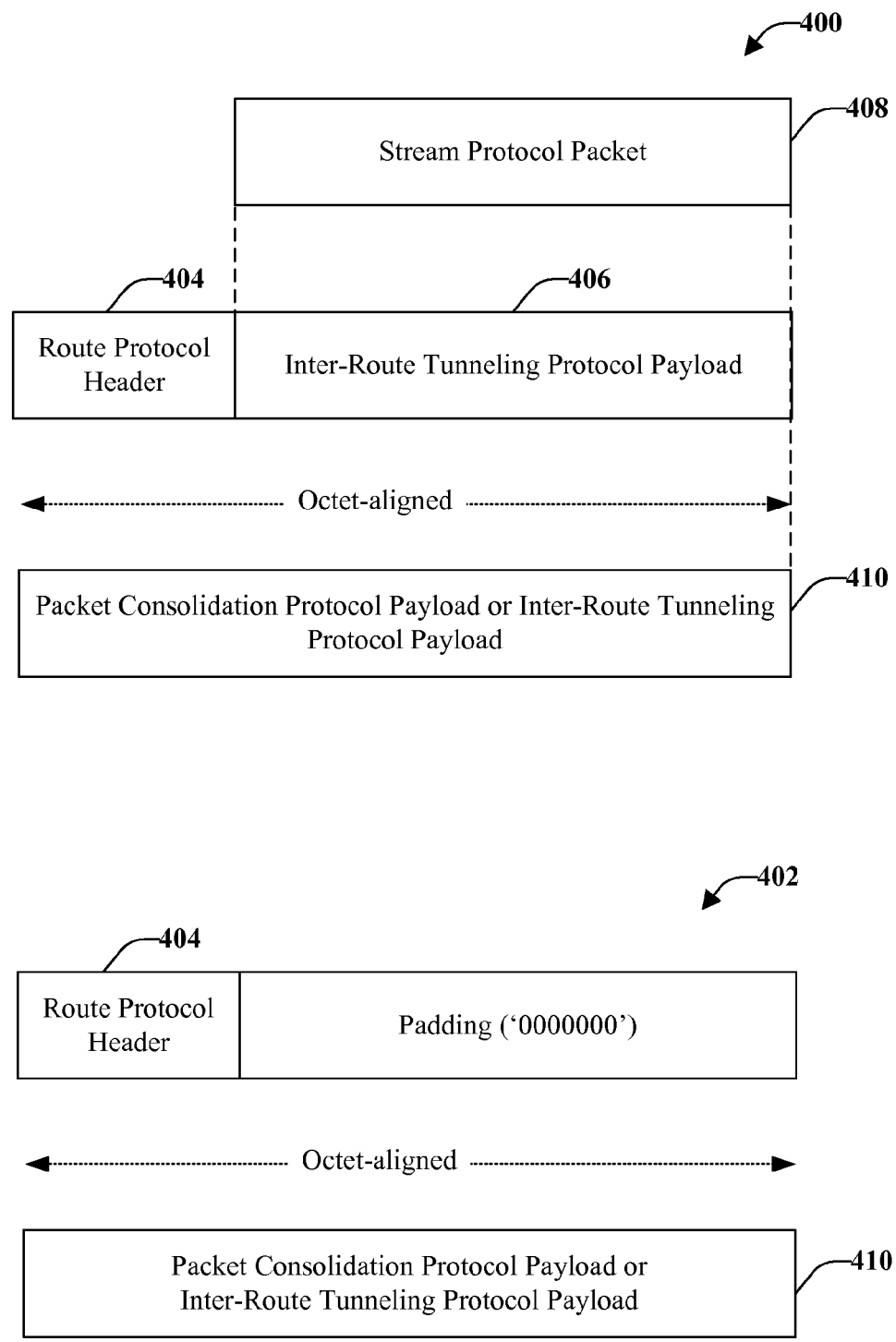
FIG. 4 illustrates two examples of route protocol packets.

In order to fully appreciate the disclosed aspects, FIG. 4 illustrates two examples of route protocol packets 400 and 402. Route protocol packet 400 includes a Route Protocol Payload 404 and a Route Protocol Header 406. Route protocol packet 402 includes a Route Protocol Header 406. The route protocol packet 400, 402 adds a route protocol header 406 to convey parameters utilized to identify the Protocol Stack associated with this Route or the Inter-Route Tunneling Protocols of this or another Route. The route protocol packet 400, 402 can also determine whether Route Protocol packets for transmission should be delivered to the Packet Consolidation Protocol of this Route or the Inter-Route Tunneling Protocol of this or another Route. A route includes an InUse protocol stack associated with an access network.

The protocol 400, 402 can return various indications, which can include an ATIReceived (ATIType, ATI, RouteStatus), a Personality Failure, RouteExists, RouteReopen, UATIFailed, RouteDoesNot Exist. In accordance with some aspects, the protocol 400, 402 can make public a subtype for this protocol, the last transmitted ATI (mobile device only), and data defined as Static Attribute, Static non-Attribute Data, and Local Common Data. The protocol 400 takes packets from a layer above (e.g., Stream Protocol Packet 408) and delivers it to a layer below (e.g., Packet Consolidation Protocol 410).

Figure 5:
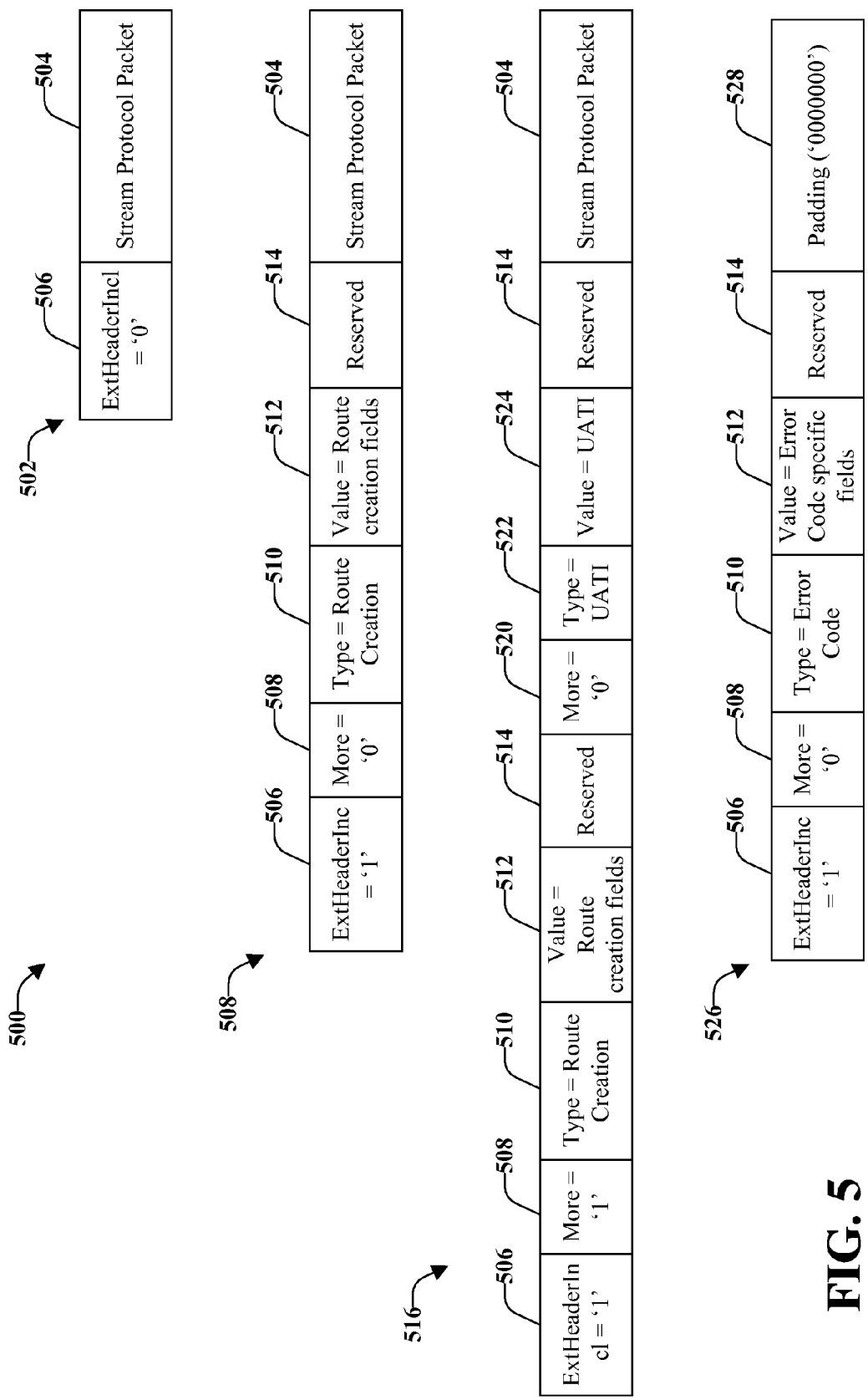
FIG. 5 illustrates example route protocol headers and how these various headers interact.

FIG. 5 illustrates example route protocol headers 500 and how these various headers interact. Details relating to the various fields will now be discussed before discussing the example route protocol headers 500. It should be noted that the naming convention, lengths, and settings of these fields are for illustration purposes and other naming conventions, lengths and/or setting can be utilized with the disclosed aspects.

A route protocol header can have an ExtendedHeaderIncluded field, which can be about one bit in length. The sender can set the ExtendedHeaderIncluded field to "1" if one or more HeaderElement records are included. Otherwise, the sender can set this field to "0". If the ExtendedHeaderIncluded field is set to "1", the sender should include one or more occurrences of the following HeaderElement Record, which are MoreHeader or HeaderType. Thus, the route protocol header may have zero or more instances of a HeaderElement, which, in accordance with some aspects, can be 8n bits in length.

A HeaderElement Format can include a MoreHeader field that can be about one bit in length. The sender can set the MoreHeader field to "1" if there is another HeaderElement record following this HeaderElement record. Otherwise the sender can set this field to "0"

The HeaderElement Format can include a HeaderType field that is around three bits in length. This field is set by the sender to indicate the type of HeaderElement record. If the HeaderType value is 000 (binary), the RouteCreation is set, for the reverse link. If the HeaderType value is 001, the ATI HeaderElement record is set. If the HeaderType is 010, the ErrorCode HeaderElement record is set, for the forward link. For other values, the Reserved HeaderElement record is set.

Also included in the HeaderElement Format can be HeaderTypeSpecific Fields that can have variable lengths and a Reserved field, which can be from zero to about seven bits in length, as needed.

If HeaderType field is set to "000", the mobile device can include variable length HeaderTypeSpecificFields. These fields can include a PSIIncluded field that is approximately one bit in length. The PSIIncluded field is set to "1" by the mobile device if the PSI field is included in this header. The mobile device sets the PSIIncluded field to "0" if the IPSI and PersonalityIndex fields are included in this header.

An IPSI field that is zero or about four bits in length is another HeaderTypeSpecific Field. The mobile device can omit the IPSI field if the PSIIncluded field is set to "1". Otherwise, the mobile device includes this field. Mobile device sets the ISPI field to the InitialProtocolSetIdentifier corresponding to the Personality selected for the Route. When the personality selected for this Route corresponds to a stored personality, this field is set to the InitialProtocolSetIdentifier associated with a stored personality.

Also included is a PersonalityIndex field that can be zero or around four bits in length. The mobile device omits the PersonalityIndex field if the PSIIncluded field is set to "1". Otherwise, the mobile device includes this field. The field, if included, is set to the PersonalityIndex of the personality selected for this Route. When the Personality selected for this Route does not correspond to a stored personality (e.g., an IPSI), the mobile device sets this field to "1111".

A PSI field is zero or approximately sixteen bits in length. The mobile device omits this field if the PSIIncluded field to set to "0". Otherwise, the mobile device includes this field. If this field is included, the mobile device sets this field to the ProtocolSetIdentifier corresponding to the Personality selected for this Route.

Further, HeaderTypeSpecificFields can include a RouteID that is about seven bits in length. The mobile device sets the RouteID field to the RouteID assigned to this Route (RouteID public data of Route Control Protocol).

A DeleteOldRoutes field that is around one bit in length can also be included. The mobile device sets this field to "1" if the access network should delete any existing Routes to this mobile device, if any.

If HeaderType field is set to "001", the sender includes an ATITtype field that is about two bits in length. The sender sets this field as follows. If the ATITType is "00" or "01", the ATIType Description is reserved. If the ATIType is "10", the ATIType Description in Unicast ATI (UATI) and is about one hundred twenty-eight bits in length. If the ATIType is "11", the ATIType description is Random ATI (RATI) and is approximately one hundred twenty-eight bits in length.

Also included is an ATI field that is around one hundred twenty eight bits in length. If the ATITType field is set to "10", the sender sets this field to the UATI (e.g., CurrentATI public data of the Route Control protocol), corresponding to this mobile device. If the ATIType field is set to "11", the sender sets this field to the RATI (e.g., CurrentATI public data of the Route Control Protocol) corresponding to this mobile device. Also included is a SessionSignatureLSB that is about two bits in length. The sender sets this field to two LSBs of SessionSignature.

If HeaderType field is set to "010", the access network includes the following variable-length record. An ErrorCode field that is about four bits in length. The access network sets the ErrorCode field as follows to indicate the error code. If the ErrorCode is 0000 (binary) it indicates the personality is not supported. Error code 0001 indicates that the Route exists. Error code 0010 indicates Close session. Error code 0011 indicates Route does not exist. Error code 0100 indicates UATI failed. Other error code values are reserved.

Also included can be a RouteID that is zero or around seven bits in length. The access network omits the RouteID field if the ErrorCode field is not set to "0001". Otherwise, the access network includes this field and sets it to the RouteID corresponding to the existing Route.

A CRCErrorDetectPattern that is zero or sixteen bits in length can also be included. The access network omits this field if the ErrorCode field is not set to "0010". Otherwise, the access network includes this field and sets it to "1010101010101010".

The sender includes a zero to seven bit field to make this HeaderElement record octet-aligned. The sender sets these bits to zero. The receiver ignores these bits.

With reference again to FIG. 5, illustrated is a route protocol packet 502 that includes a stream protocol packet 504 and an extended header included (ExHeaderIncl) field 506. In this packet 502, the ExHeaderIncl field is set to "0", which indicates that an extended header is not included.

A route protocol packet with a route creation header 508 is also illustrated. This packet 508 includes a stream protocol packet 504 and an ExHeaderIncl field 506, which for this packet 508 is set to "1" to indicate that there is an extended header included. Another field that is also included is a More field 508, which is set to "0". The More Field indicates if more than one header is included at the same time or if in the same packet there could be more than one header. A type field 510 is set to "Route Creation" to indicate that the header is a route creation header and a value field 512, which indicates the route creation fields. Also included is a reserved field 514.

A route protocol packet with route creation and ATI headers 516 includes a stream protocol packet 504 and an ExHeaderIncl Field 506, which is set to "1". Also included is a more field 508, which is set to 1 and a Type field 510, indicating a route creation. Also included is a value field 512 that indicates route creation fields. This packet 516 also includes two reserved fields 514. Further included is a second more field 520, set to "0" and a type field 522, which indicates UATI. Also included is a value field 524, set to UATI.

In accordance with some aspects, if more than one Packet Consolidation Protocol Packet will be carried in a single MAC packet, the HeaderElement records in all Packet Consolidation Packets except the first one in the MAC packet can be omitted. This can mitigate the overhead in case multiple packets are being sent together and all of them share the same header. The mobile device can perform an optimization and include the header only in the first packet. That can save resources over the air to improve efficiency or optimize system.

At 526, illustrated is a Route Protocol Packet with an Error Code Header. Included is a Padding ('0000000') field 528, a reserved field 514 and an ExtHeaderIncl field 506, which is set to "1". Also included is a More Field 508, set to "0" and a Type Field 510, set to "Error Code". For this packet 526, a Value Field 512 is set to ErrorCode Specific Fields.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
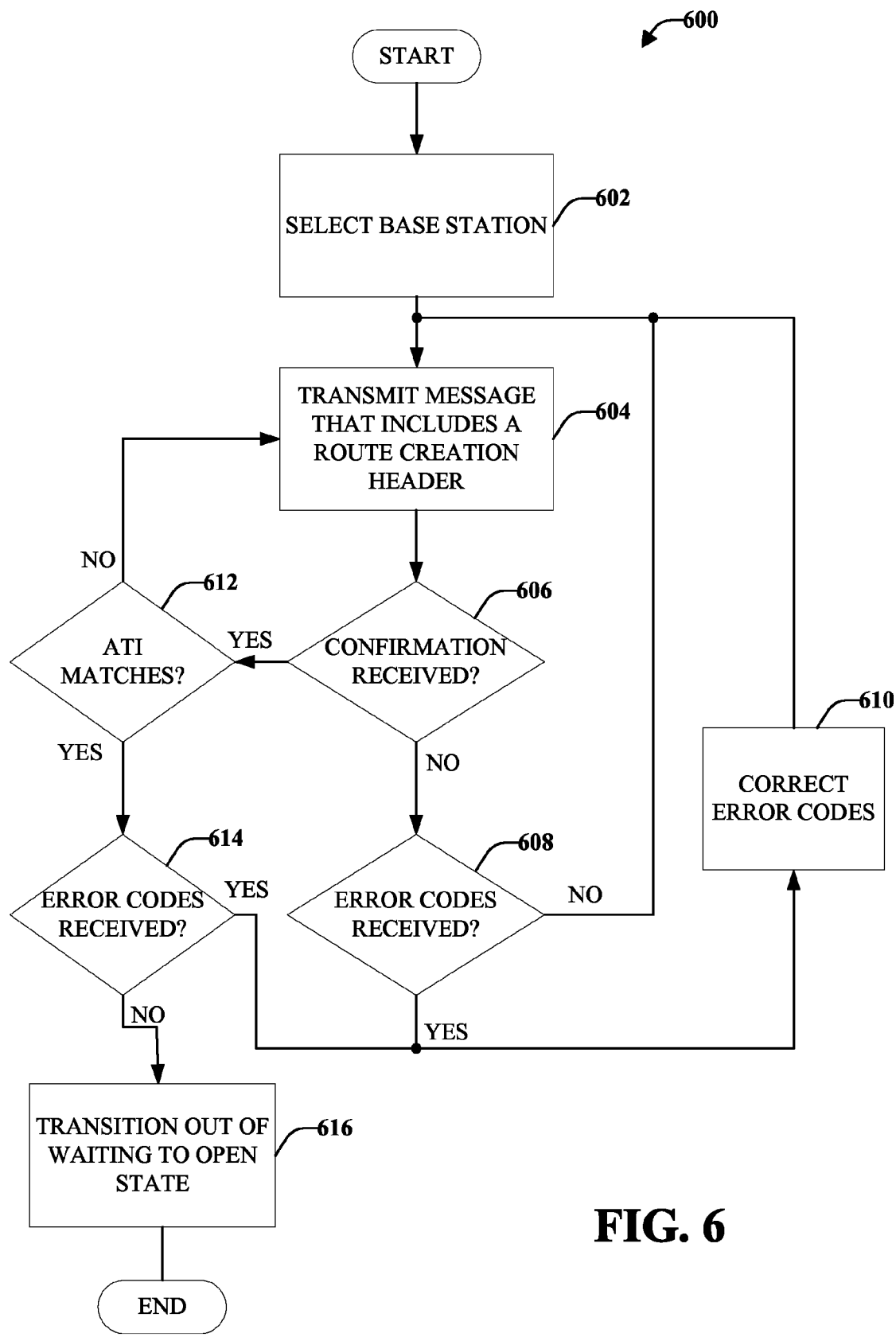
FIG. 6 illustrates a method for creating a tunnel relationship between a mobile device and a base station.

FIG. 6 illustrates a method 600 for creating a tunnel relationship between a mobile device and a base station. Tunnel relationships can enable flat network architectures by enabling a mobile device to communicate with individual cell sites (e.g., base stations) independently without a central controller. A multi-route approach can also simplify mobile device and base station communication, as well as communications between base station interfaces.

Method 600 starts, at 602, when a selection of at least one base station with which to establish communication through a tunnel is made. This decision can be made based on a pilot waveform that is detected from a base station with which a mobile device does not have direct connectively. The tunnel can be established from the mobile device, through a base station with which the mobile device has direct connectivity (e.g., primary base station), to one or more secondary base stations.

At 604, a message that includes a Route Creation Header is transmitted to the one or more selected base stations. This message can be sent through a primary base station. The Route Creation Header includes one or more parameters associated with defining the tunnel. Included in the Route Creation Header are various fields, which can include an Access Terminal Identifier (ATI), a personality selection, a route identification of the route, whether existing routes should be deleted, and so forth. For example, an identifier for the tunnel to the at least one base station can be created and a personality for the tunnel chosen, wherein the personality includes one or more protocol types and one or more attribute values. The tunnel identifier and the chosen personality can be included in the Route Creation Header. When a new route is to be created, the mobile device is in a "Waiting to Open" state. This state indicates that a packet or confirmation of the tunnel being created has not yet been received from the (secondary) base station.

In accordance with some aspects, transmitting the message includes determining if one or more Packet Consolidation Protocol Packets are to be carried in a single MAC packet. Each Packet Consolidation Protocol Packet includes a Header Element Record. Thus, the Header Element Records from all but one of the Packet Consolidation Protocol Packets can be omitted, which can save resources and improve efficiency.

In accordance with some aspects, the Route Control Protocol selects an InitialProtocolSetIdentifier or a PersonalityIndex to describe the personality of the new protocol stack. If the overhead information corresponding to this pilot is available, the InitialProtocolSetIdentifier corresponding to the selected personality is equal to one of the InitialProtocolSetIdentifier values advertised by the access network corresponding to this pilot; otherwise, the access terminal may choose an InitialProtocolSetIdentifier or PersonalityIndex based on an implementation-defined decision.

The method 600 can wait for a confirmation of the Route Creation Header. At 606, a determination is made whether a confirmation of the tunnel request has been received from the (secondary) base station. Confirmation indicates creation of a tunnel relationship between the mobile device and the base station. The confirmation can include receiving a packet from the at least one base station. If the confirmation is not received "NO", a determination is made, at 608, whether one or more error codes were received. If no error codes were received "NO", method continues, at 604, when the message is re-transmitted. If one or more error codes were received, "YES", at 610, the error codes are corrected and method continues, at 604. Further information relating to these error codes will be provided below.

If the determination, at 606, is that a confirmation is received, "YES", at 612, a determination is made whether the confirmation includes receiving a header from the (secondary) base station that includes an ATI field that is set to the ATI field transmitted by mobile device in the Route Creation Header. If the ATI fields match, "YES", it indicates that the (secondary) base station recognizes this mobile device. If the fields do not match, "NO", the base station does not recognize the mobile device. In accordance with some aspects, the Route Creation Header is re-transmitted, at 604, if the ATI fields do not match.

If the ATI fields match at 612 ("YES"), method 600 continues, at 614, where a determination is made whether one or more error codes are received in a packet sent by secondary base stations. These error codes can include that a personality proposed by the mobile device is not supported by the base station and that a route or tunnel between the base station and mobile device already exists. Another error code can indicate that the base station (or network) desires to close the session due to various causes. Other error codes include an indication that a route between the base station and the mobile device does not exist, although the mobile device mistakenly thought that the route did exist, and a UATI failure. In accordance with some aspects, more than one error code can be conveyed by base station to mobile device.

If no error codes are received "NO", method 600 continues at 616, with a transition out of "Waiting To Open" state. If one or more error codes are received ("YES"), at 614, the error codes can be corrected, at 610, and a message, with an updated route protocol header can be sent, at 604.

A type of error can be a personality error, which can be received in a packet from the base station, the packet includes a personality error code. The personality error can be corrected by reviewing a list of ranked personalities received with the packet, which includes the personalities supported by the base station. These personalities can be ranked by the base station based on criteria of the mobile device and/or the base station. The ranking can include an order of preference. A personality is selected from the listing of personalities supported by the base station. The Route Creation Header Packet can be modified to include the selected personality and the modified Route Creation Header Packet can be transmitted to the base station, at 604.

Another type of error received in the packet can be a session close error. The packet can also include a CRCErrorDetectPattern. In this case, mobile device can attempt to reestablish a network connection with the network that includes the base station. The re-authentication with the network can be established if the CRCErrorDetectPattern indicates the session close error code is not due to a link error.

Another error code included in the packet can indicate that a route is already established with the base station. Included in the packet is a route identification of the established route. In this case, it can be decided that the tunnel relationship between the mobile device and the base station is not needed, since a relationship already exists. Thus, method 600 can end rather than sending a new message, at 604.

A further type of error is a route does not exist, as indicated by an error code. In this case, a Route Protocol Header can be sent to the base station to establish a route to that base station. If a UATI error is received, the correct ATI, once established can be sent in the Route Protocol Header, at 604.

Figure 7:
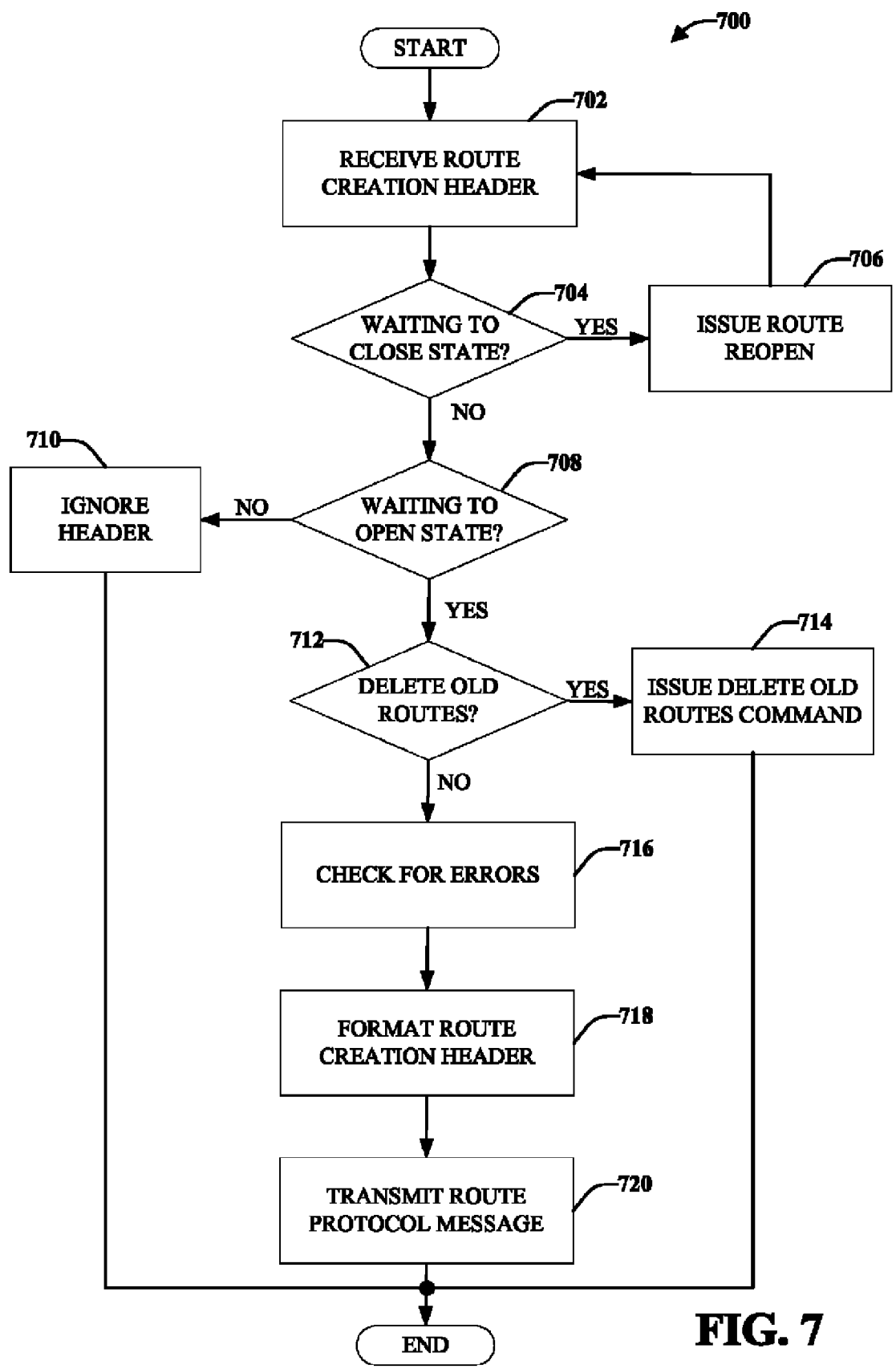
FIG. 7 illustrates a method for establishing communication between a mobile device and a base station through a tunnel.

FIG. 7 illustrates a method 700 for establishing communication between a mobile device and a base station through a tunnel. Method starts, at 702, when a Route Creation Protocol Header is received from a mobile device. The Route Creation Protocol Header can include one or more parameters associated with defining a tunnel. This header can be received in a message and can include various information such an Access Terminal Identifier (ATI), a personality selection, a route identification of the route, whether existing routes should be deleted, and so forth.

In accordance with some aspects, a RouteID header (short address) can be received from a mobile device, however, the base station does not recognize the RouteID header (e.g., there is no mapping between the RouteID header and the ANID). In this situation, the base station can send a RouteMapRequest message to the mobile device requesting a current Route Map. In accordance with some aspects, the mobile device does not use a RouteID header for a destination route if a RouteMap message containing the ANID to RouteID mapping for this destination Route was not sent to this access network (e.g., base station).

A determination is made at 704, whether the mobile device is in a Waiting-To-Close State, as indicated by a field within the Route Creation Protocol Header. If the device is in the Waiting-To-Close State "YES", at 706, a Route Reopen indication is sent to the mobile device in order to enter an Open State. Method 700 can continue, at 702, when a message is received from mobile device.

If the device is not in a Waiting-To-Close State ("NO") a determination is made, at 708, whether the device is in a Waiting-To-Open state, as indicated in a field of the header. If the device is not in the Waiting-To-Open state and the Route Creation Header does not include a Delete All Routes Flag, at 710, the Header is ignored (since the device is not in the Waiting-To-Open state nor the Waiting-To-Close state). In accordance with some aspects if a route is already established with the mobile device, the Header is ignored. If the device is in the Waiting-To-Open state, at 712, a determination is made whether all routes should be deleted. Triggers that can specify whether the delete old routes flag should be set can include the situation where the mobile device has lost a Radio Link Protocol (RLP) state. If all routes should be deleted ("Yes"), at 714, a Delete Old Routes Command is issued and method 700 ends, until a new route is established.

If, at 712, it is determined that the old routes should not be delete ("NO"), method 700 continues, at 716, where error conditions are checked (if the device is in the Waiting-To-Open state).

An error condition can be if a personality proposed by the mobile device is not supported by the base station. The personality comprises one or more protocol types and one or more attribute values. If the proposed personality is not supported, an error code is sent in response to the Route Creation Header. The personality comprises one or more protocol types and one or more attribute values. At substantially the same time as the error code is sent, a listing or recommended personality can also be sent in a Route Protocol Message sent in response to the Route Creation header received. This listing can be ranked in an order of preference, wherein a more preferred personality is listed first. The preference can be determined based on performance as some personalities might achieve higher packet or data rates and those personalities might be more preferred. For example, some personalities are fine-tuned for different applications. If a mobile device is, for example, a video conferencing device, it might have a different personality. The base station can rank these personalities based on a criteria that is applied to the types of applications the mobile device is running and the capabilities of the mobile device. The ranking can indicate the personalities that will provide the mobile device the highest data rate or highest performance, which are listed first. If the mobile device can support the first ranked personality, that one is chosen, else the mobile device attempts to use the next ranked personality, and so forth. Thus, the order of preference is specific to the base station (e.g., characteristics of the base station) and is also specific to the mobile device. In accordance with some aspects, a base station could provide a certain order of preference to a first mobile device and a different order of preference to another mobile device.

Another error code is if a route between the base station and the mobile device already exists. In this situation, there is no need to create another route. A route identification of the already established route can be included in the Route Protocol Message sent in response to the Route Creation Header.

Another error code is if the session is to be closed, such as if the mobile device no longer has the credentials necessary to access the network. The instructions indicating that the route should be closed can be received from a Session Reference Network Controller. At substantially the same time as this error code is sent, a CRCErrorDetectPattern can be sent to mitigate the chances of the session being closed due to a link error.

Another error code is sent if the route between the base station and mobile device does not exist. This situation occurs when the mobile device believes that a route does exist, however one has not been established. In this case, an error code is included in the Route Protocol Message that indicates the route does not exist. The determination of this error can be made based on receiving a packet that does not include a Route Creation Header and a route has not been established with the mobile device. The mobile device is outside the Waiting-To-Open state when this error occurs.

A further error code can occur if the UATI fails because the ATI does not match. This occurs if the ATI was changed while the route is being established. The device, upon receiving this error code can supply the correct ATI in order to establish communications with the base station. The identification of the mobile device can fail based on information received from a Session Reference Network Controller.

In some situations, the base station to which the tunnel is being created (e.g., secondary base station) may not know the most recent identifier of the mobile device, because the mobile device's address has changed. In cases where the address has not changed, the serving base station (e.g., primary base station) can communicate the address to the secondary base station. However, if the address has changed recently, the serving base station may not be aware of the change in the address, because the address change is a process between the SRNC (central controller) and the mobile device, of which serving base station is not aware. For example, if the address has changed in the last X seconds (where X is an integer, such as 5 in one example), then the mobile device includes the new address during route creation, and otherwise omits the address. This allow the secondary base station to have the most recent information about the mobile device's address in case the address recently changed, and can mitigate the overhead of including the address in cases where the address did not change recently.

At 718, a route protocol message is created taking into account any errors discovered, as well as other criteria (e.g., ATI field). The route protocol message is sent to the mobile device, at 720, in order to establish the relationship (e.g., tunnel) between the base station and the mobile device.

In order to more fully appreciate the disclosed aspects, the following will present details relating to transmission and reception of route protocol headers. It should be appreciated that although the following provides specific details of one implementation of the disclosed aspects, other implementation techniques can be utilized with the disclosed aspects.

The following presents a transmission procedure from the perspective of a mobile device. A Basic Route Protocol receives a Stream Protocol Packet for transmission or desires to send a Route Protocol Packet with no payload. At the mobile device, the Route Protocol sends a packet with no payload when provides a payload to the MAC Layer and no Stream Protocol Packet is available. In this situation, the Basic Route Protocol can perform the following described procedure. The Basic Route Protocol adds a Route Protocol Header to create a Route Protocol Packet by determining if one or more HeaderElement records should be added.

A HeaderElement record of HeaderType of '000' (e.g., RouteCreation header) is added if state public data of the Route Control Protocol is in Waiting-To-Open state and the mobile device has not received any packets from the access network on this route.

If a HeaderElement record of HeaderType of '000' (e.g., RouteCreation header) is being added, the mobile device can create a personality. If there is a pending personality switch request from the access network, the mobile device sets the PersonalityIndex field of the header to the value of PendingPersonalityIndex public data of the Session Control Protocol. If the mobile device has created this Route in response to a RouteCreate message, then the mobile device can includes either a PSI field or an IPSI and PersonalityIndex fields in the header. Otherwise, the mobile device includes IPSI and PersonalityIndex fields in the header.

A HeaderElement record of HeaderType of '001' (e.g., ATI header) is added if the state public data of the Connected State Protocol is set to BindATI and the mobile device has not received a Route Protocol header from the access network containing an ATI header identical to the one sent by the mobile device.

If a HeaderElement record of HeaderType of '001' (e.g., ATI header) is being added, the mobile device can perform the following procedure. If the CurrentATI public data of the Route Control Protocol is set to UATI, the mobile device sets ATIType field to '10' and sets the ATI field to the CurrentATI public data of the Route Control Protocol. If the CurrentATI public data of the Route Control Protocol is set to RATI, the mobile device sets the ATIType field to '11' and sets the ATI field to the CurrentATI public data of the Route Control Protocol. The mobile device sets a LastTransmittedATI to (value of ATIType field|value of ATI field).

If more than one Packet Consolidation Protocol Packet will be carried in a single MAC packet, the Basic Route Protocol omits the HeaderElement records in all Packet Consolidation Protocol Packets except the first one included in the MAC packet. The Route Protocol uses information from the Packet Consolidation Protocol to perform this procedure.

If there is no need to add any HeaderElement records, the Basic Route Protocol sets the ExtendedHeaderIncluded field to '0'. Otherwise, the Basic Route Protocol sets the ExtendedHeaderIncluded field to '1' and adds the required number of HeaderElement records. In accordance with some aspects, if this corresponds to a Route Protocol Packet with no payload, the Basic Route Protocol can set the Padding field to '0000000'.

If there is currently no Route that is the Reverse Link Serving Route (as indicated by the RLSS public data of the Reverse Control Channel MAC Protocol), the Route Protocol issues an AirlinkManagement.OpenConnection command. Otherwise, the Route Control Protocol can perform the following. If this Route is the Reverse Link Serving Route (as indicated by the RLSS public data of the Reverse Control Channel MAC Protocol), the Basic Route Protocol delivers the Route Protocol Packet to the Packet Consolidation Protocol of its Route but may deliver the Route Protocol Packet to the Inter-Route Tunneling Protocol of its Route. Otherwise, the Basic Route Protocol delivers the Route Protocol Packet to the Inter-Route Tunneling Protocol of the Reverse Link Serving Route (as indicated by the RLSS public data of the Reverse Control Channel MAC Protocol).

The following will present an exemplary transmission procedure from the perspective of the base station. If the Basic Route Protocol receives a Stream Protocol Packet for transmission or wants to send a Route Protocol Packet with no payload, the Basic Route Protocol can perform the following. The Basic Route Protocol adds a Route Protocol Header to create a Route Protocol Packet as follows. The Basic Route Protocol determines if one or more HeaderElement records need to be added as follows. A HeaderElement record of HeaderType of '010' (e.g., ErrorCode header) can be included as follows.

The access network does not include more than one HeaderElement record of HeaderType of '010' (e.g., ErrorCode header.) If the access network receives a RouteCreation header from the mobile device, and the personality proposed by the mobile device is not supported by the access network, the access network sets the ErrorCode field to '0000'. If the access network receives a RouteCreation header from the mobile device with DeleteOldRoutes set to '0', a Route already exist for this mobile device, and the State public data of the Route Control Protocol is not set to WaitingToClose state, the access network sets the ErrorCode field to '0001'. The ErrorCode field is set to '0010' if the access network is requesting to close the session. If the access network receives a HeaderElement record of HeaderType of '001' (e.g., ATI header) from the mobile device but without a HeaderElement record of HeaderType of '000' (e.g., RouteCreation header), the access network is not the SessionAnchor, and if Route does not exist for this mobile device, then the access network sets the ErrorCode field to '0011'.

A HeaderElement record of HeaderType of '001' (e.g., ATI header) is included if the ProtocolState public data of the Connected State Protocol is set to BindATI. The access network sets the ATIType and ATI fields to the corresponding values received from the mobile device.

If there is no need to add any HeaderElement records based on the above rules, the Basic Route Protocol sets the ExtendedHeaderIncluded field to 0'. Otherwise, the Basic Route Protocol sets the ExtendedHeaderIncluded field to '1' and adds the required number of HeaderElement records. If this corresponds to a Route Protocol Packet with no payload, the Basic Route Protocol sets the Padding field to '0000000'.

The Basic Route Protocol can perform the following. If this Route is the Forward Link Serving Route (as indicated by the FLSS public data of the Reverse Control Channel MAC Protocol), the Basic Route Protocol can deliver the Route Protocol Packet to the Packet Consolidation Protocol of its Route but may deliver the Route Protocol Packet to the Inter-Route Tunneling Protocol of its Route. Otherwise, the Basic Route Protocol delivers the Route Protocol Packet to the Inter-Route Tunneling Protocol of the Forward Link Serving Route (as indicated by the FLSS public data of the Reverse Control Channel MAC Protocol).

The following presents an exemplary reception procedure from the perspective of the mobile device. If the Basic Route Protocol receives a Route Protocol Packet from the Packet Consolidation Protocol of its Route or from the Inter-Route Tunneling Protocol of its Route or another Route, the Basic Route Protocol can perform the following. The Basic Route Protocol removes the Route Protocol Header present to produce a Stream Protocol Packet or a Padding field as follows.

If a HeaderElement record of HeaderType of '010' (e.g., ErrorCode header) is present with ErrorCode field set to '0000', the Basic Route Protocol returns a PersonalityFailure indication. If a HeaderElement record of HeaderType of '010' (e.g., ErrorCode header) is present with ErrorCode field set to '0001', the Basic Route Protocol returns a RouteExists indication. If a HeaderElement record of HeaderType of '010' (e.g., ErrorCode header) is present with ErrorCode field set to '0010' and the CRCErrorDetectPattern field is set to '1010101010101010', the Basic Route Protocol issues a SessionControl.Deactivate command. If a HeaderElement record of HeaderType of '010' (e.g., ErrorCode header) is present with ErrorCode field set to '0011', the Basic Route Protocol returns a RouteDoesNotExist indication. If a HeaderElement record of HeaderType of '010' (e.g., ErrorCode header) is present with ErrorCode field set to '0100', the Basic Route Protocol returns a UATIFailed indication.

The Basic Route Protocol returns an ATIReceived(ATIType, ATI, Route Status indication. This indication can be used when the state public data of the Connected State Protocol is equal to Binding ATI. If this indication is utilized, the arguments can be set as follows. If a HeaderElement record of HeaderType of '001' (e.g., ATI header) is present, ATIType and ATI arguments can be set to the corresponding values received in the header. If a HeaderElement record of HeaderType of '001' (e.g., ATI header) is not present, ATIType and ATI arguments can be set to NULL. If a HeaderElement record of HeaderType of '001' (e.g., ATI header) is not present or if a HeaderElement record of HeaderType of '010' was present, RouteStatus can be set to 0x1. Otherwise, RouteStatus can be set to 0x0.

If the Route Protocol Packet consists of a Padding field of '0000000' and not a Stream Protocol Payload, the Basic Route Protocol discards the Padding field. Otherwise, the Basic Route Protocol delivers the Stream Protocol Packet to the Stream Protocol of its Route.

The following presents an exemplary reception procedure from the perspective of the base station. If the Basic Route Protocol receives a Route Protocol Packet from the Packet Consolidation Protocol of its Route or from the Inter-Route Tunneling Protocol of its Route or another Route, the Basic Route Protocol can perform the following. The Basic Route Protocol removes the Route Protocol Header present to produce a Stream Protocol Packet or a Padding field as follows.

If a HeaderElement record of HeaderType of '001' (e.g., ATI header) is present, the Basic Route Protocol returns a ATIReceived(ATIType, ATI, RouteStatus) indication with ATI set to the received value of ATI. If a HeaderElement record of HeaderType of '000' (e.g., RouteCreation header) is present, the access network can perform the following. The access network can ignore this header if State public data of the Route Control Protocol is not equal to Waiting-To-Open or Waiting-To-Close.

If the header is not ignored, the access network can perform the following. If the DeleteOldRoutes field is set to '1', the Basic Route Protocol issues a RouteControl.DeleteOldRoutes command. If State public data of the Route Control Protocol is set to Waiting-To-Close, the Route Protocol returns a RouteReopen indication.

If the Route Protocol Packet consists of a Padding field of '0000000' and not a Stream Protocol Payload, the Basic Route Protocol discards the Padding field. Otherwise, the Basic Route Protocol delivers the Stream Protocol Packet to the Stream Protocol of its Route.

Figure 8:
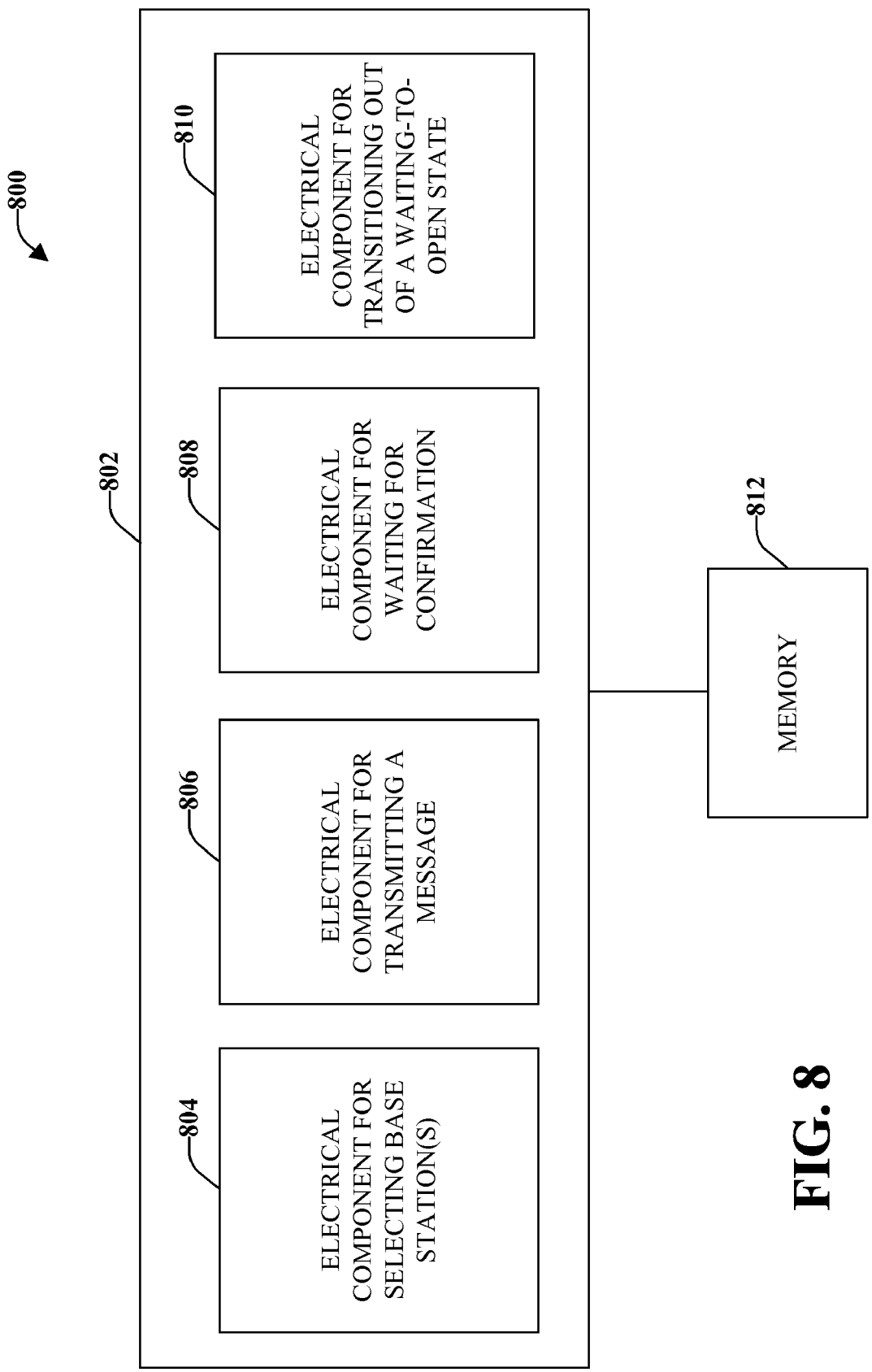
FIG. 8 illustrates an example system that creates a tunnel relationship between a mobile device and a base station.

With reference to FIG. 8, illustrated is an example system 800 that creates a tunnel relationship between a mobile device and a base station. System 800 may reside at least partially within a mobile device. It is to be appreciated that system 800 is represented as including functional blocks, which may be functional blocks that represent functions implemented by a processor, software, or combination thereof (e.g., firmware).

System 800 includes a logical grouping 802 of electrical components that can act separately or in conjunction. Logical grouping 802 may include an electrical component for selecting at least one base station for establishment of communication through a tunnel 804. Also included in logical grouping is an electrical component for transmitting a message that includes a Route Creation Header to the at least one base station 806. The Route Creation Header comprises one or more parameters associated with defining the tunnel.

Logical grouping 802 also includes an electrical component for waiting for a confirmation of the Route Creation Header 808. The confirmation includes receiving a packet from the at least one base station. Electrical component 806 can re-transmit the message that includes the Route Creation Header to the at least one base station until the confirmation is received. Further, logical grouping 802 includes an electrical component for transitioning out of a Waiting-To-Open state when the confirmation is received 810.

In accordance with some aspects, logical grouping 802 includes an electrical component for determining that two or more Packet Consolidation Protocol Packets will be carried in a single MAC packet. Each Packet Consolidation Protocol Packet includes a Header Element record. Also included in logical grouping 802 can be an electrical component for omitting the Header Element record from all but one of the Packet Consolidation Packets.

In accordance with some aspects, logical grouping can include an electrical component for receiving a packet from the at least one base station. The packet includes a personality error code. Also included is an electrical component for reviewing a list of ranked personalities received with the packet and an electrical component for selecting a personality from the list of ranked personalities. Further, logical grouping can include an electrical component for modifying the Route Creation Header Packet to include the selected personality and an electrical component for transmitting the modified Route Creation Header Packet to the at least one base station.

In accordance with some aspects, logical grouping 802 includes an electrical component for receiving a packet from the at least one base station. The packet includes a route already established error code and a route identification of the established route. Also included is an electrical component for deciding that the tunnel relationship is not needed.

In accordance with some aspects, logical grouping includes an electrical component for receiving a packet from the at least one base station. The packet includes a session close error code and a CRCErrorDetectPattern. Also included in logical grouping 802 is an electrical component for re-authenticating with a network that includes the at least one base station if the CRCErrorDetectPattern indicates the session close error code is not due to a link error.

Additionally, system 800 can include a memory 812 that retains instructions for executing functions associated with electrical components 804, 806, 808, and 810 or other components. While shown as being external to memory 812, it is to be understood that one or more of electrical components 804, 806, 808, and 810 may exist within memory 812.

Figure 9:
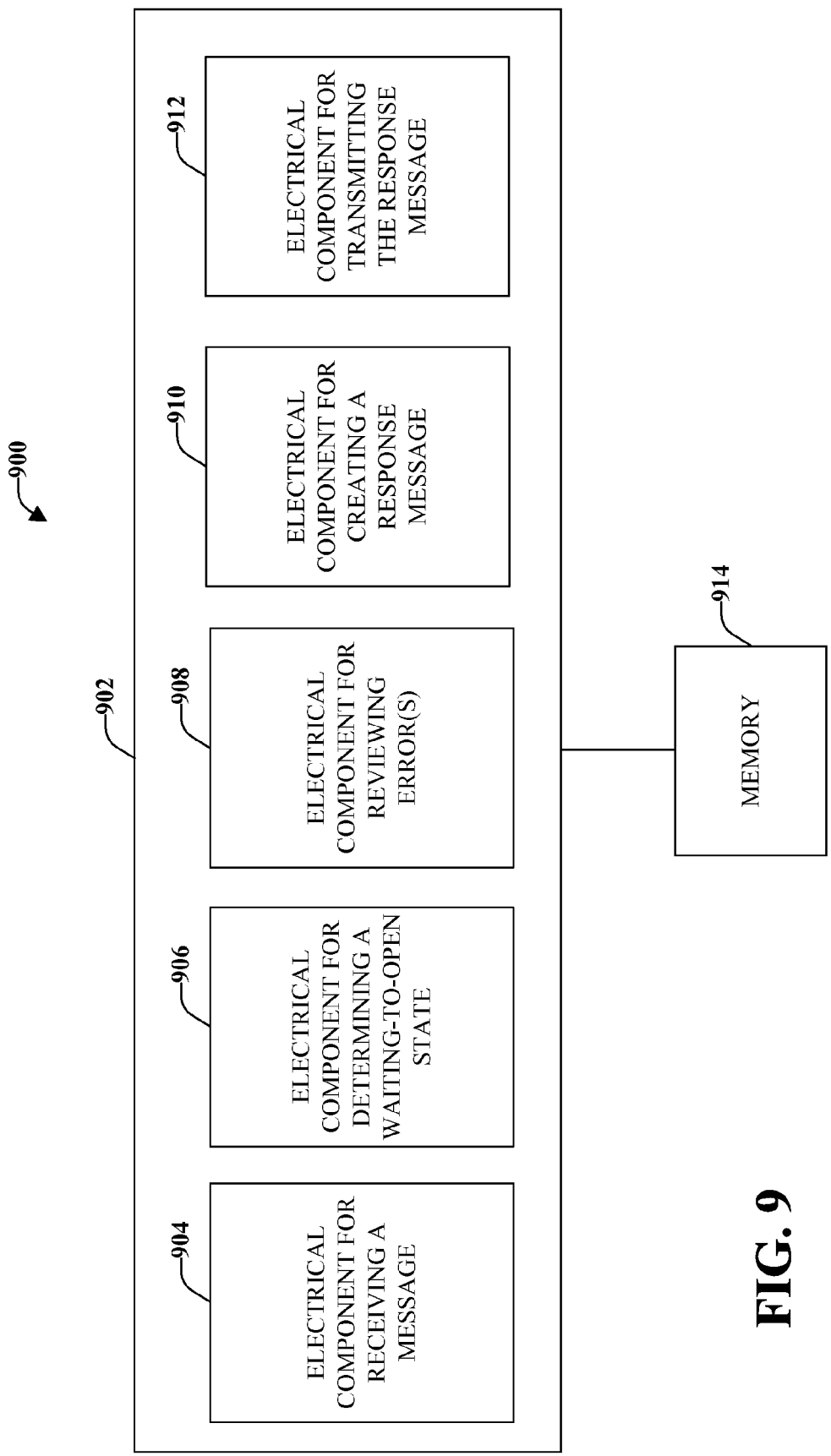
FIG. 9 illustrates an example system that creates a tunnel relationship between a mobile device and a base station.

With reference to FIG. 9, illustrated is an example system 900 that creates a tunnel relationship between a mobile device and a base station. System 900 may reside at least partially within a base station. It is to be appreciated that system 900 is represented as including functional blocks, which may be functional blocks that represent functions implemented by a processor, software, or combination thereof (e.g., firmware).

System 900 includes a logical grouping 902 of electrical components that can act separately or in conjunction. Logical grouping 902 may include an electrical component for receiving a message that includes a Route Creation Header from a mobile device 904. The Route Creation Header comprises one or more parameters associated with defining a tunnel. Also included in logical grouping 902 is an electrical component for determining if the mobile device is in a Waiting-To-Open state 904. Further, logical grouping includes an electrical component for reviewing the Route Creation Header for at least one error if the mobile device is in the Waiting-To-Open state 908. Also included is an electrical component for creating a Route Protocol Message in response to the received message 910. Further, logical grouping 902 can include an electrical component for transmitting the created Route Protocol Message to the mobile device. In accordance with some aspects, logical grouping 902 includes an electrical component for ignoring the Route Creation Header from a mobile device if the device is not in the Waiting-To-Open state.

According to some aspects, logical grouping includes an electrical component for determining if a personality requested in the received Route Creation Header is not supported and an electrical component for accessing a Session Reference Network Controller to determine personalities that are supported. Also included in logical grouping 902 can be an electrical component for ranking the supported personalities in an order of preference and an electrical component for including the ranked supported personalities in the Route Protocol Message.

Additionally, system 900 can include a memory 914 that retains instructions for executing functions associated with electrical components 904, 906, 908, 910, and 912 or other components. While shown as being external to memory 914, it is to be understood that one or more of electrical components 904, 906, 908, 910, and 912 may exist within memory 914.

It is to be understood that the aspects described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine-readable medium and/or computer readable medium, which may be incorporated into a computer program product.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDME, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description of the claims is meant to be a "non-exclusive or".

The invention claimed is:

1. A method for creating a tunnel relationship between a mobile device and a base station, comprising:
   selecting at least one base station for establishment of communication through a tunnel;
   transmitting a message that includes a Route Creation Header to the at least one base station, the Route Creation Header comprises one or more parameters associated with defining the tunnel;
   waiting for a confirmation of the Route Creation Header;
   transitioning out of a Waiting to Open state if the confirmation is received, wherein the confirmation indicates creation of the tunnel relationship;
   including an access terminal identifier (ATI) in the Route Creation Header if the ATI has recently changed; and
   wherein transmitting the message that includes the Route Creation Header to the at least one base station further comprises:
      determining that two or more Packet Consolidation Protocol packets will be carried in a single media access control (MAC) packet, each Packet Consolidation Protocol packet includes a Header Element record; and
      omitting the Header Element record from all but one of the Packet Consolidation Protocol packets.

2. The method of claim 1, further comprising:
   receiving a packet from the at least one base station, the packet includes a personality error code;
   reviewing a list of ranked personalities received with the packet;
   selecting a personality from the list of ranked personalities;
   modifying the Route Creation Header to include the selected personality; and
   transmitting a message including the modified Route Creation Header to the at least one base station.

3. The method of claim 1, further comprising:
   receiving a packet from the at least one base station, the packet includes a route already established error code and a route identification of the established route; and
   deciding that a tunnel relationship is not needed.

4. The method of claim 1, further comprising:
receiving a packet from the at least one base station, the packet includes a session close error code and a CRCErrorDetectPattern; and
re-authenticating with a network that includes that at least one base station if the CRCErrorDetectPattern indicates the session close error code is not due to a link error.

5. The method of claim 1, further comprising:
including a RouteID header in the message;
receiving a request for a current route map, if the RouteID header is not recognized by a serving base station; and
transmitting the current route map in response to the request.

6. A wireless communications apparatus, comprising:
a memory that retains instructions for selecting at least one base station for establishment of communication through a tunnel, transmitting a message that includes a Route Creation Header to the at least on base station, waiting for a confirmation of the Route Creation Header, and transitioning out of a Waiting-To-Open state if the confirmation is received, wherein the Route Creation Header comprises one or more parameters associated with defining the tunnel;
a processor, coupled to the memory, configured to execute the instructions retained in the memory; and
wherein the memory further retains instructions for determining that two or more Packet Consolidation Protocol Packets are to be carried in a single MAC packet, each Packet Consolidation Protocol Packet includes a Header Element record, and omitting the Header Element record from all but one of the Packet Consolidation Packets, and for including an access terminal identifier (ATI) in the route Creation Header if the ATI has recently changed.

7. The wireless communications apparatus of claim 6, wherein the memory further retains instructions for receiving a packet from the at least one base station, the packet includes a personality error code, reviewing a list of ranked personalities received with the packet, selecting a personality from the list of ranked personalities, modifying the Route Creation Header to include the selected personality, and transmitting a message including the modified Route Creation Header to the at least one base station.

8. The wireless communications apparatus of claim 6, wherein the memory further retains instructions for receiving a packet from the at least one base station and deciding that the tunnel relationship is not needed, wherein the packet includes a route already established error code and a route identification of the established route.

9. The wireless communications apparatus of claim 6, wherein the memory further retains instructions for receiving a packet from the at least one base station, wherein the packet includes a session close error code and a CRCErrorDetectPattern, and re-authenticating with a network that includes that at least one base station if the CRCErrorDetectPattern indicates the session close error code is not due to a link error.

10. The wireless communications apparatus of claim 6, wherein the memory further retains instructions for including a RouteID header in the message, receiving a request for a current route map, if the RouteID header is not recognized by a serving base station, and transmitting the current route map in response to the request.

11. A wireless communication apparatus, comprising:
means for selecting at least one base station for establishment of communication through a tunnel;
means for transmitting a message that includes a Route Creation Header to the at least one base station, wherein the Route Creation Header comprises one or more parameters associated with defining the tunnel;
means for retransmitting the message that includes the Route Creation Header until a confirmation of the Route Creation Header is received, wherein the confirmation includes receiving a first packet from the at least one base station, the means for transmitting the message re-transmits the message that includes the Route Creation Header to the at least one base station until the confirmation is received;
means for transitioning out of a Waiting-To-Open state when the confirmation is received;
means for determining that two or more Packet Consolidation Protocol Packets will be carried in a single MAC packet, each Packet Consolidation Protocol Packet includes a Header Element record;
means for omitting the Header Element record from all but one of the Packet Consolidation Packets; and
means for including an access terminal identifier (ATI) in the Route Creation Header if the ATI has recently changed.

12. The apparatus of claim 11, further comprising:
means for receiving a packet from the at least one base station, the packet includes a personality error code;
means for reviewing a list of ranked personalities received with the packet;
means for selecting a personality from the list of ranked personalities;
means for modifying the Route Creation Header to include the selected personality; and
means for transmitting a message including the modified Route Creation Header to the at least one base station.

13. The apparatus of claim 11, further comprising:
means for receiving a packet from the at least one base station, the packet includes a route already established error code and a route identification of the established route; and
means for deciding that a tunnel relationship is not needed.

14. The apparatus of claim 11, further comprising:
means for receiving a packet from the at least one base station, the packet includes a session close error code and a CRCErrorDetectPattern; and
means for re-authenticating with a network that includes that at least one base station if the CRCErrorDetectPattern indicates the session close error code is not due to a link error.

* * * * *